(12) United States Patent
Okabe

(10) Patent No.: US 10,385,272 B2
(45) Date of Patent: Aug. 20, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Eiji Okabe, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 15/521,303

(22) PCT Filed: Jul. 10, 2015

(86) PCT No.: PCT/JP2015/069825
§ 371 (c)(1),
(2) Date: Apr. 24, 2017

(87) PCT Pub. No.: WO2016/063585
PCT Pub. Date: Apr. 28, 2016

(65) Prior Publication Data
US 2017/0313940 A1 Nov. 2, 2017

(30) Foreign Application Priority Data
Oct. 24, 2014 (JP) ................. 2014-217068

(51) Int. Cl.
| | | |
|---|---|---|
| *G02F 1/1333* | (2006.01) | |
| *C09K 19/34* | (2006.01) | |
| *C09K 19/12* | (2006.01) | |
| *C09K 19/14* | (2006.01) | |
| *C09K 19/16* | (2006.01) | |
| *C09K 19/18* | (2006.01) | |
| *C09K 19/20* | (2006.01) | |
| *C09K 19/30* | (2006.01) | |
| *C09K 19/42* | (2006.01) | |
| *G02F 1/13* | (2006.01) | |
| *G02B 27/22* | (2018.01) | |
| *C09K 19/04* | (2006.01) | |

(52) U.S. Cl.
CPC .......... *C09K 19/3463* (2013.01); *C09K 19/12* (2013.01); *C09K 19/14* (2013.01); *C09K 19/16* (2013.01); *C09K 19/18* (2013.01); *C09K 19/20* (2013.01); *C09K 19/30* (2013.01); *C09K 19/3003* (2013.01); *C09K 19/3048* (2013.01); *C09K 19/3059* (2013.01); *C09K 19/34* (2013.01); *C09K 19/3402* (2013.01); *C09K 19/3461* (2013.01); *C09K 19/42* (2013.01); *G02B 27/2214* (2013.01); *G02F 1/13* (2013.01); *C09K 2019/0466* (2013.01); *C09K 2019/122* (2013.01); *C09K 2019/123* (2013.01); *C09K 2019/181* (2013.01); *C09K 2019/183* (2013.01); *C09K 2019/188* (2013.01); *C09K 2019/3009* (2013.01); *C09K 2019/3016* (2013.01); *C09K 2019/3025* (2013.01); *C09K 2019/3051* (2013.01); *C09K 2019/3063* (2013.01); *C09K 2019/3422* (2013.01)

(58) Field of Classification Search
CPC .... C09K 19/3463; C09K 19/12; C09K 19/14; C09K 19/16; C09K 19/18; C09K 19/20; C09K 19/30; C09K 19/3003; C09K 19/3048; C09K 19/3059; C09K 19/34; C09K 19/3402; C09K 19/3461; C09K 19/42; C09K 2019/0466; C09K 2019/122; C09K 2019/123; C09K 2019/181; C09K 2019/183; C09K 2019/188; C09K 2019/3009; C09K 2019/3016; C09K 2019/3025; C09K 2019/3051; C09K 2019/3063; C09K 2019/3422; G02F 1/13; G02F 1/1333; G02B 27/2214
USPC ..................................... 252/299.61
See application file for complete search history.

(56) References Cited

U.S. PATENT DOCUMENTS 9,879,183 B2 * 1/2018 Takahashi ............. C07C 43/225
10,100,252 B2 * 10/2018 Okabe ................ C09K 19/3491
(Continued)

FOREIGN PATENT DOCUMENTS

| CN | 103254909 | 8/2013 |
|---|---|---|
| JP | 2004231738 | 8/2004 |

(Continued)

OTHER PUBLICATIONS

"International Search Report (Form PCT/ISA/210) of PCT/JP2015/069825", dated Oct. 13, 2015, with English translation thereof, pp. 1-4.

*Primary Examiner* — Geraldina Visconti
(74) *Attorney, Agent, or Firm* — JCIPRNET

(57) ABSTRACT

Provided is a liquid crystal composition satisfying at least one or having suitable balance regarding at least two of characteristics such as high maximum or low minimum temperature of a nematic phase, large optical anisotropy, large positive dielectric anisotropy and high stability to ultraviolet light, and a liquid crystal display device including such a composition, particularly an encapsulated liquid crystal display device, and a liquid crystal display device serving as a constituent of 3D lenses. The liquid crystal composition contains a specific compound having large optical anisotropy as a first component, and a specific compound having large optical anisotropy and large positive dielectric anisotropy as a second component; a specific compound having large positive dielectric anisotropy as a third component; and a specific compound having large optical anisotropy and further having high maximum or low minimum temperature as a fourth component, and the liquid crystal display device includes the composition.

15 Claims, No Drawings

(56) References Cited

U.S. PATENT DOCUMENTS

2014/0225036 A1  8/2014  Kaneoya et al.
2017/0362507 A1* 12/2017  Okabe ................ C09K 19/3491

FOREIGN PATENT DOCUMENTS

| JP | 2005015688 | 1/2005 |
| JP | 2006089622 | 4/2006 |
| WO | 2013018796 | 2/2013 |

* cited by examiner

LIQUID CRYSTAL COMPOSITION AND LIQUID CRYSTAL DISPLAY DEVICE

CROSS-REFERENCE TO RELATED APPLICATION

This application is a 371 application of International PCT application serial no. PCT/JP2015/069825, filed on Jul. 10, 2015, which claims the priority benefit of Japan application no. 2014-217068, filed on Oct. 24, 2014.The entirety of each of the above-mentioned patent applications is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having large optical anisotropy and large positive dielectric anisotropy, and a device including the composition.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time of the device. A short response time is preferred for displaying moving images on the device. A shorter response time even by one millisecond is desirable. Accordingly, a small viscosity in the composition is preferred. However, the small viscosity does not apply to a mode (for example, a polymer-stabilized blue phase (PSBP) liquid crystal display, a nanocapsule liquid crystal display and so forth) to show electric field induced transition based on a Kerr effect, and a higher-speed response can be expected regardless of a viscosity of a liquid crystal.

TABLE 1

| Characteristics of Composition and AM Device | | |
|---|---|---|
| No. | Characteristics of composition | Characteristics of AM device |
| 1 | Wide temperature range of a nematic phase | Wide usable temperature range |
| 2 | Small viscosity [1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

1) A Composition can be Injected into a Liquid Crystal Display Device in a Short Time.

Optical anisotropy of the composition relates to a contrast ratio in the device. According to a mode of the device, large optical anisotropy or small optical anisotropy, more specifically, suitable optical anisotropy is required. A product (Δn×d) of the optical anisotropy (An) of the composition and a cell gap (d) in the device is designed so as to maximize the contrast ratio. A suitable value of the product depends on a type of the operating mode. In a device having a mode such as TN, a suitable value is about 0.45 micrometers. In the above case, a composition having the large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having the large specific resistance at room temperature and also at a temperature close to the maximum temperature of the nematic phase in an initial stage is preferred. The composition having the large specific resistance at room temperature and also at a temperature close to the maximum temperature of the nematic phase even after the device has been used for a long period of time is preferred. Stability of the composition to ultraviolet light and heat relates to a service life of the liquid crystal display device. In the case where such stability is high, the device has a long service life. Such characteristics are preferred for an AM device used in a liquid crystal projector, a liquid crystal television and so forth.

A composition having positive dielectric anisotropy is used in an AM device having the TN mode. A composition having negative dielectric anisotropy is used in an AM device having the VA mode. In an AM device having the IPS mode or the FFS mode, a composition having positive or negative dielectric anisotropy is used. In an AM device having a polymer sustained alignment (PSA) mode, a composition having positive or negative dielectric anisotropy is used. Examples of a liquid crystal composition having positive dielectric anisotropy are disclosed in Patent literature Nos. 1 to 5 described below.

CITATION LIST

Patent Literature

Patent literature No. 1: JP 2006-89622 A.
Patent literature No. 2: JP 2004-231738 A.
Patent literature No. 3: JP 2005-15688 A.
Patent literature No. 4: WO 2013/018796 A.
Patent literature No. 5: CN 103254909 A.

In a liquid crystal display device technology, major problems are almost being solved. A problem of a view angle is improved by using a multidomain structure and an optical compensation film, a problem of a response time is improved by controlling a pretilt angle of a liquid crystal by operating reactive monomer and utilizing an overdrive method, and a problem of a contrast is decreased by a local dimming technology of backlight. However, if the liquid crystal display device technology is seen in more detail, problems still remained in the technology such as a technology of decreasing production cost and a flexible display technology. As an activity solving the problems, a polymer-dispersed liquid crystal (PDLC), a polymer network liquid crystal (PNLC), a pixel-isolated liquid crystal (PILC) or the like have been studied, but not solved yet.

As a means to solve the problems, a nanoencapsulated liquid crystal display device is studied. The liquid crystal display device technology which combined with the IPS mode has the following features: (1) a cost-benefit performance is high because no need an alignment layer in cell production process, and no assembly process exists due to single-sided substrate structure; (2) a state where no voltage is applied has an optical isotropy because of a particle size effect of an extremely small liquid crystal nanocapsule fixed to a nanoencapsulated layer; and (3) a good compatibility with a flexible display is shown because the production is performed by a printing method of the liquid crystal nanocapsule to the single-sided substrate, in place of requiring a conventional liquid crystal injection process. The nanoencapsulated liquid crystal display device shows the electric field induced transition from the optical isotropy state to an anisotropic state based on the Kerr effect. In order to obtain the Kerr effect as larger as possible, a liquid crystal showing a nematic phase having large optical anisotropy and large dielectric anisotropy is suitable.

Moreover, use in a liquid crystal lens that allows switching between 2D and 3D is also considered as a device requiring such large optical anisotropy and large dielectric anisotropy. Specific examples of a technology for the device that allows switching between 2D and 3D include (1) a liquid crystal barrier type and (2) a liquid crystal lens type. The liquid crystal barrier type is easy to produce, and also easy to switch between 2D and 3D. However, the liquid crystal barrier type has a disadvantage in which luminance of 3D image is reduced by 50% or more by reduction of the luminance caused by a liquid crystal barrier. The liquid crystal lens type is expected as a promising device without such a disadvantage.

SUMMARY OF INVENTION

Technical Problem

One of aims of the invention is to provide a liquid crystal composition satisfying at least one of characteristics such as high maximum temperature of a nematic phase, low minimum temperature of the nematic phase, large optical anisotropy, large positive dielectric anisotropy and high stability to ultraviolet light. Another aim is to provide a liquid crystal composition having a suitable balance regarding at least two of the characteristics. Another aim is to provide a liquid crystal display device including such a composition. Another aim is to provide a liquid crystal display device in which such a liquid crystal composition is encapsulated. Another aim is to provide a liquid crystal display device in which such a liquid crystal composition is served as a constituent of 3D lenses.

Solution to Problem

The invention concerns a liquid crystal composition that contains at least one compound selected from the group of compounds represented by formula (1) as a first component, and at least one compound selected from the group of compounds represented by formula (2-1) or formula (2-2) as a second component, wherein a proportion of a compound having cyano is less than 3% by weight based on a total of the liquid crystal composition when the compound is included as a compound other than a component compound that constitutes the liquid crystal composition, and a liquid crystal display device including the composition:

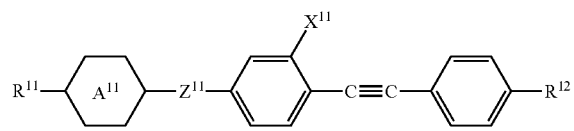

(1)

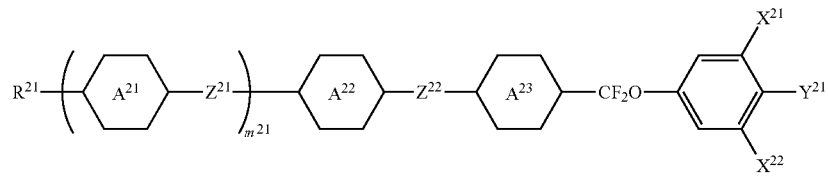

(2-1)

-continued

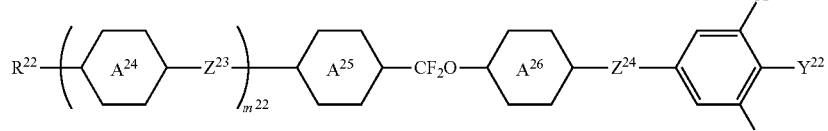

(2-2)

wherein, in formula (1), formula (2-1) and formula (2-2), $R^{11}$, $R^{12}$, $R^{21}$ and $R^{22}$ are independently alkyl having 1 to 12 carbons, alkoxy having 1 to 12 carbons or alkenyl having 2 to 12 carbons; ring $A^{11}$ is 1,4-cyclohexylene, 1,4-phenylene, 2-fluoro-1,4-phenylene, 2,5-difluoro-1,4-phenylene or 2,6-difluoro-1,4-phenylene; ring $A^{21}$ and ring $A^{24}$ are independently 1,4-cyclohexylene, 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; ring $A^{22}$, ring $A^{23}$, ring $A^{25}$ and ring $A^{26}$ are independently 1,4-phenylene, 2-fluoro-1,4-phenylene or 2,6-difluoro-1,4-phenylene; $Z^{11}$, $Z^{21}$, $Z^{22}$, $Z^{23}$ and $Z^{24}$ are independently a single bond, ethylene, vinylene, methyleneoxy, carbonyloxy, difluoromethyleneoxy, ethynylene or tetrafluoroethylene, in which at least one of $Z^{21}$ and $Z^{22}$ is ethynylene, and at least one of $Z^{23}$ and $Z^{24}$ is ethynylene; $X^{11}$, $X^{21}$, $X^{22}$, $X^{23}$ and $X^{24}$ are independently hydrogen or fluorine; $Y^{21}$ and $Y^{22}$ are independently fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and $m^{21}$ and $m^{22}$ are independently 0, 1 or 2, and when $m^{21}$ or $m^{22}$ represents 2, a plurality of ring $A^{21}$, $Z^{21}$, ring$^{24}$ and $Z^{23}$ may be identical or different, respectively.

Advantageous Effects of Invention

An advantage of the invention is a liquid crystal composition satisfying at least one of characteristics such as high maximum temperature of a nematic phase, low minimum temperature of the nematic phase, large optical anisotropy, large positive dielectric anisotropy and high stability to ultraviolet light. Another advantage is a liquid crystal composition having a suitable balance regarding at least two of the characteristics. Another advantage is a liquid crystal display device including such a liquid crystal composition. Another advantage is a liquid crystal display device in which such a liquid crystal composition is encapsulated. Another advantage is a liquid crystal display device in which such a liquid crystal composition is served as a constituent of 3D lenses.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with a composition for the purpose of adjusting characteristics such as a temperature range of the nematic phase, viscosity and a dielectric anisotropy. The compound has a six-membered ring such as 1,4-cyclohexylene and 1,4-phenylene, and has rod-like molecular structure. "Polymerizable compound" is a compound to be added for the purpose of forming a polymer in the composition. At least one compound selected from the group of compounds represented by formula (1) may be occasionally abbreviated as "compound (1)." "Compound (1)" means one compound or two or more compounds represented by formula (1). A same rule applies also to any other compound represented by any other formula. An expression "at least one piece of" in the context of "replaced by" means that not only a position but also the number thereof can be selected without restriction.

The liquid crystal composition is prepared by mixing a plurality of liquid crystal compounds. A proportion (content) of the liquid crystal compound is expressed in terms of weight percent (% by weight) based on the weight of the liquid crystal composition. An additive such as an optically active compound, an antioxidant, an ultraviolet light absorber, a dye, an antifoaming agent, the polymerizable compound, a polymerization initiator and a polymerization inhibitor is added to the liquid crystal composition when necessary. A proportion (amount of addition) of the additive is expressed in terms of weight percent (% by weight) based on the weight of the liquid crystal composition in a manner similar to the proportion of the liquid crystal compound. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance at room temperature and also at a temperature close to the maximum temperature of the nematic phase in an initial stage, and the composition has the large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in the initial stage, and the device has the large voltage holding ratio at room temperature and also at a temperature close to the maximum temperature of the nematic phase even after the device has been used for a long period of time.

An expression "at least one piece of 'A' may be replaced by 'B'" means that the number of 'A' is arbitrary. When the number of 'A' is 1, a position of 'A' is arbitrary, and also when the number of 'A' is 2 or more, positions thereof can be selected without restriction. A same rule applies also to an expression "at least one piece of 'A' is replaced by 'B'."

A symbol of terminal group $R^{11}$ is used in a plurality of compounds in chemical formulas of component compounds.

cyano is less than 3% by weight based on a total of the liquid crystal composition when the compound having cyano is contained as a compound other than a component compound that constitutes the liquid crystal composition:

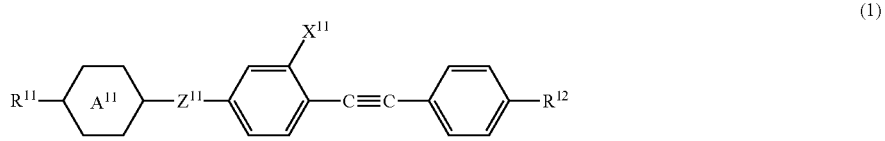

(1)

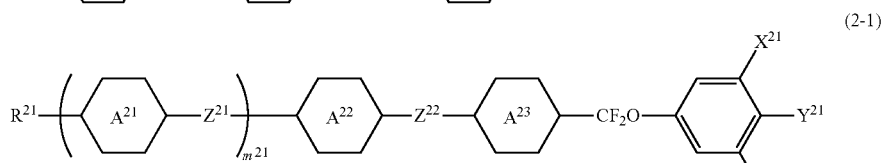

(2-1)

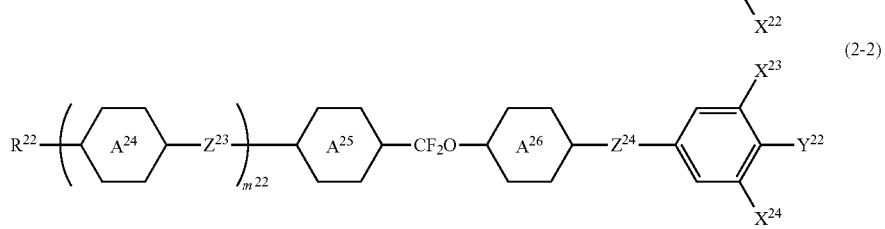

(2-2)

In the compounds, two groups represented by two pieces of arbitrary $R^{11}$ may be identical or different. For example, in one case, $R^{11}$ of compound (1-1) is ethyl and $R^{11}$ of compound (1-2) is ethyl. In another case, $R^{11}$ of compound (1) is ethyl and $R^{11}$ of compound (1-2) is propyl. A same rule applies also to a symbol such as $R^{12}$, $R^{21}$, $R^{31}$, $R^{41}$ and $R^{42}$. In formula (2-1), when $m^{21}$ is 2, two of ring $A^{21}$ exists. In the compound, two rings represented by two of ring $A^{21}$ may be identical or different. A same rule applies also to $Z^{21}$, ring $A^{24}$, $Z^{23}$, ring $A^{31}$, $Z^{31}$, ring $A^{42}$, $Z^{42}$ or the like.

Then, 2-fluoro-1,4-phenylene means two divalent groups described below. In a chemical formula, fluorine may be leftward (L) or rightward (R). A same rule applies also to a divalent group of asymmetrical ring such as 2,5-difluoro-1, 4-phenylene, 2,6-difluoro-1,4-phenylene, pyridine-2,5-diyl, pyrimidine-2,5-diyl, 1,3-dioxane-2,5-diyl and tetrahydropyran-2,5-diyl.

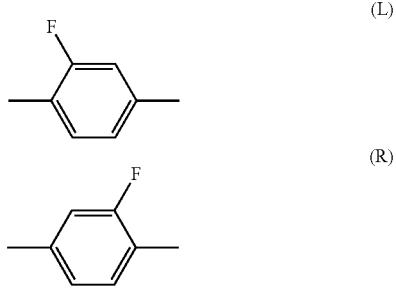

The invention includes items described below.

Item 1. A liquid crystal composition, containing at least one compound selected from the group of compounds represented by formula (1) as a first component, and at least one compound selected from the group of compounds represented by formula (2-1) or formula (2-2) as a second component, wherein a proportion of a compound having wherein, in formula (1), formula (2-1) and formula (2-2), $R^{11}$, $R^{12}$, $R^{21}$ and $R^{22}$ are independently alkyl having 1 to 12 carbons, alkoxy having 1 to 12 carbons or alkenyl having 2 to 12 carbons; ring $A^{11}$ is 1,4-cyclohexylene, 1,4-phenylene, 2-fluoro-1,4-phenylene, 2,5-difluoro-1,4-phenylene or 2,6-difluoro-1,4-phenylene; ring$^{21}$ and ring $A^{24}$ are independently 1,4-cyclohexylene, 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; ring $A^{22}$, ring $A^{23}$, ring $A^{25}$ and ring $A^{26}$ are independently 1,4-phenylene, 2-fluoro-1,4-phenylene or 2,6-difluoro-1,4-phenylene; $Z^{11}$, $Z^{21}$, $Z^{22}$, $Z^{23}$ and $Z^{24}$ are independently a single bond, ethylene, vinylene, methyleneoxy, carbonyloxy, difluoromethyleneoxy, ethynylene or tetrafluoroethylene, in which at least one of $Z^{21}$ and $Z^{22}$ is ethynylene, and at least one of $Z^{23}$ and $Z^{24}$ is ethynylene; $X^{11}$, $X^{21}$, $X^{22}$, $X^{23}$ and $X^{24}$ are independently hydrogen or fluorine; $Y^{21}$ and $Y^{22}$ are independently fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and $m^{21}$ and $m^{22}$ are independently 0, 1 or 2, and when $m^{21}$ or $m^{22}$ represents 2, a plurality of ring $A^{21}$, $Z^{21}$, ring $A^{24}$ and $Z^{23}$ may be identical or different, respectively.

Item 2. The liquid crystal composition according to item 1, containing at least one compound selected from the group of compounds represented by formula (1-1) to formula (1-13) as the first component:

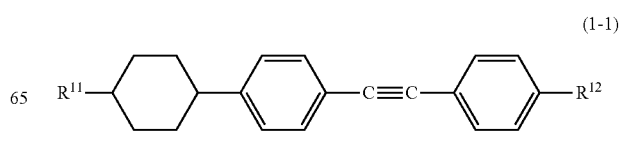

(1-1)

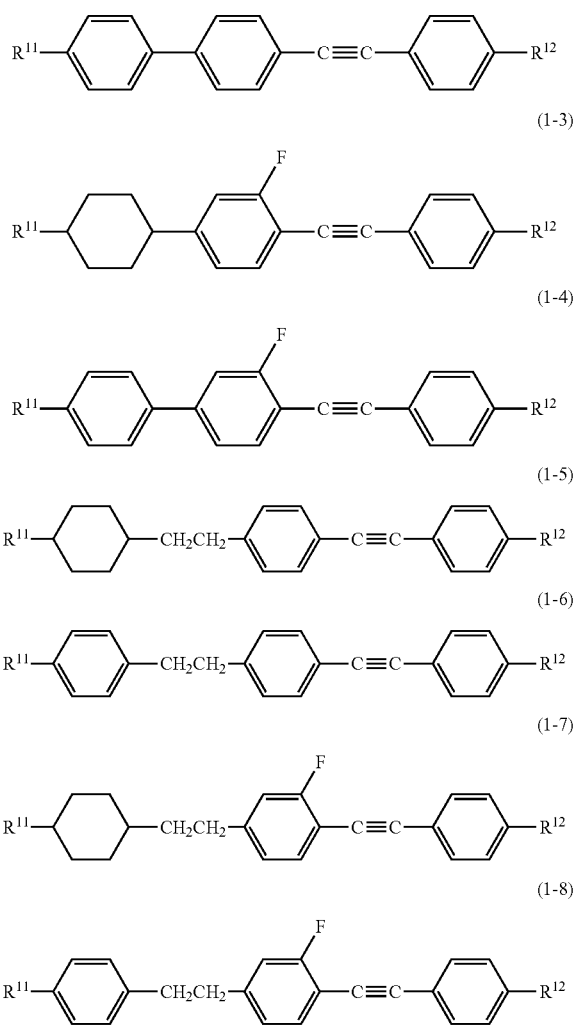

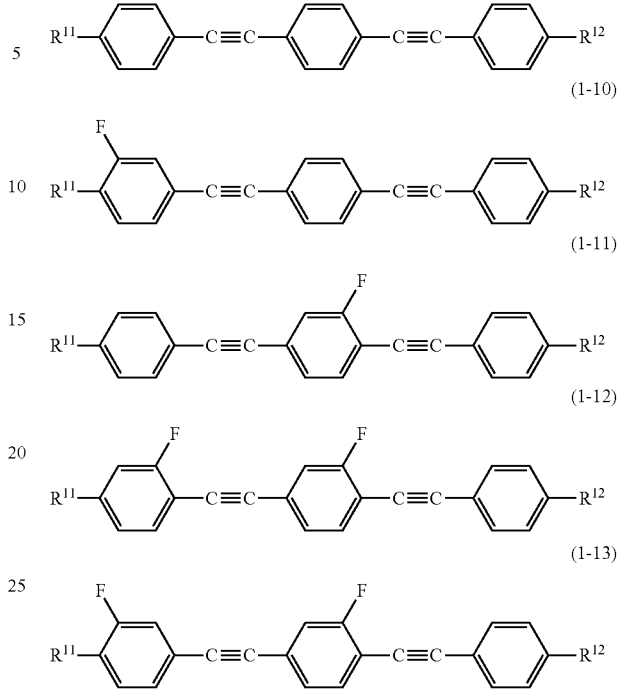

wherein, in the formulas, $R^{11}$ and $R^{12}$ are independently alkyl having 1 to 12 carbons, alkoxy having 1 to 12 carbons or alkenyl having 2 to 12 carbons.

Item 3. The liquid crystal composition according to item 1 or 2, wherein a proportion of a compound represented by formula (1) described in item 1 is in the range of 10% by weight to 50% by weight based on the weight of the liquid crystal composition.

Item 4. The liquid crystal composition according to any one of items 1 to 3, containing at least one compound selected from the group of compounds represented by formula (2-1-1) to formula (2-1-14) and formula (2-2-1) to formula (2-2-2) as the second component:

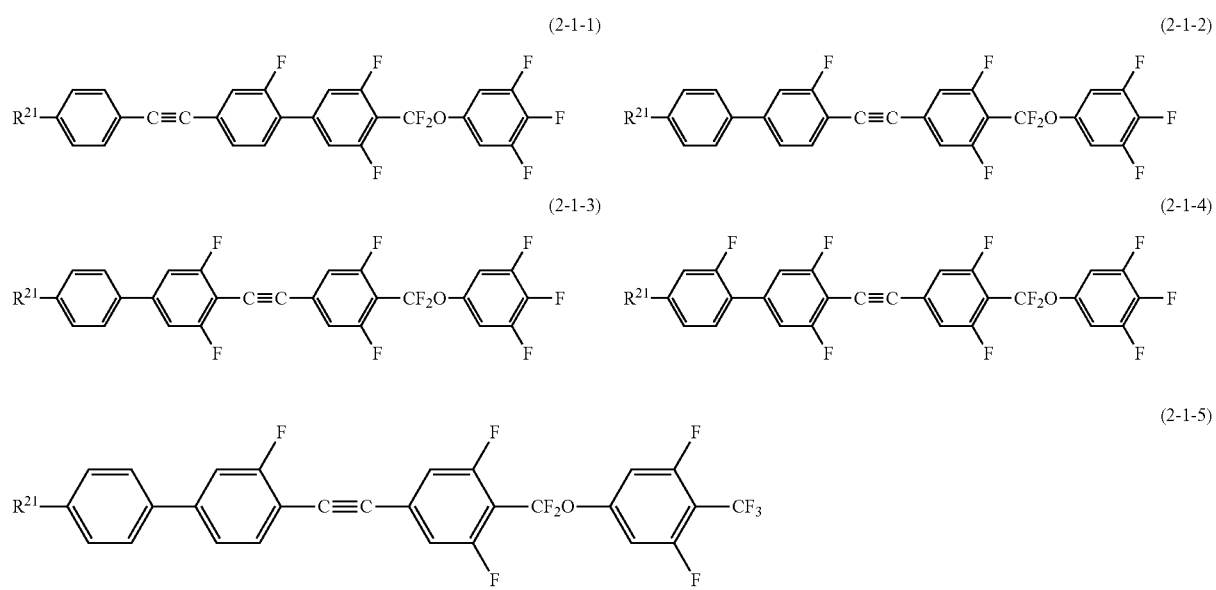

-continued

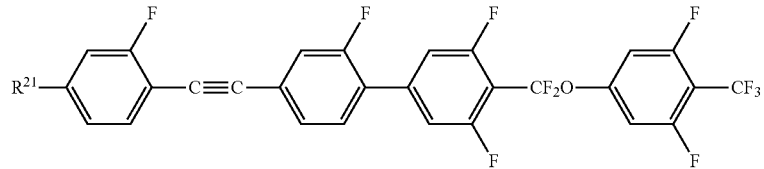
(2-1-6)

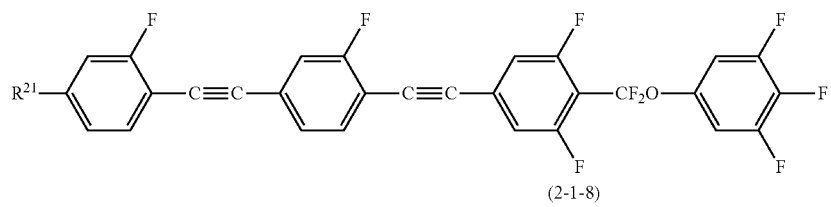
(2-1-7)

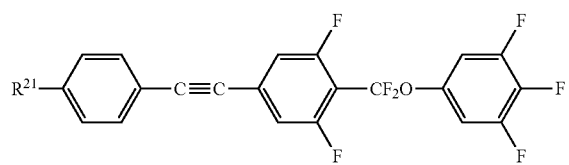
(2-1-8)

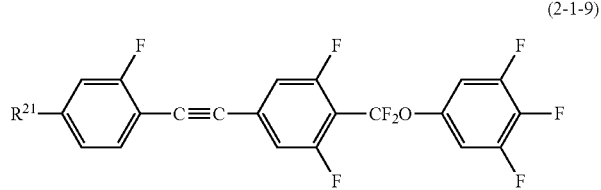
(2-1-9)

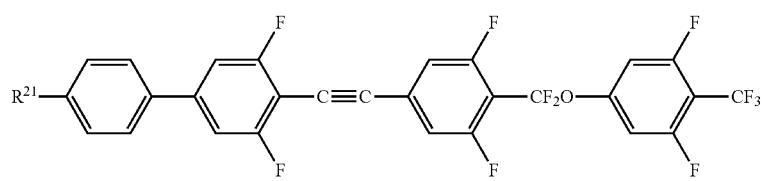
(2-1-10)

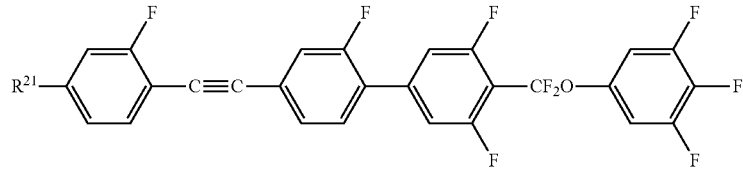
(2-1-11)

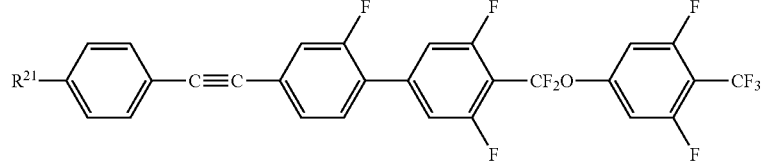
(2-1-12)

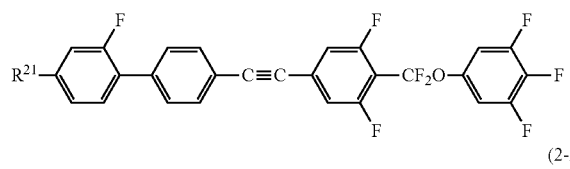
(2-1-13)

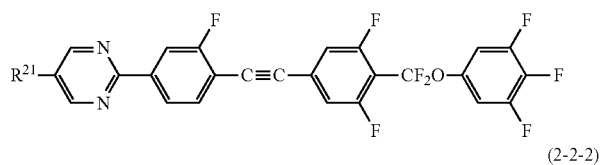
(2-1-14)

(2-2-1)

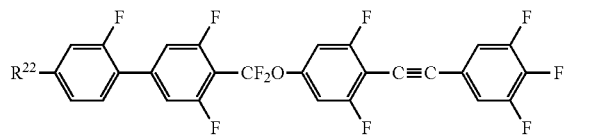
(2-2-2)

wherein, in the formulas, $R^{21}$ and $R^{22}$ are independently alkyl having 1 to 12 carbons, alkoxy having 1 to 12 carbons or alkenyl having 2 to 12 carbons.

Item 5. The liquid crystal composition according to any one of items 1 to 4, wherein a proportion of a compound represented by formula (2-1) and formula (2-2) described in item 1 is in the range of 5% by weight to 60% by weight based on the weight of the liquid crystal composition.

Item 6. The liquid crystal composition according to any one of items 1 to 5, further containing at least one compound selected from the group of compounds represented by formula (3) as a third component:

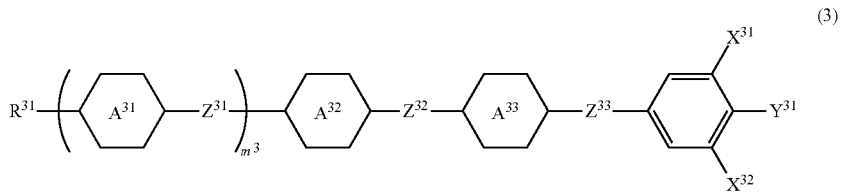

(3)

wherein, in formula (3), $R^{31}$ is alkyl having 1 to 12 carbons, alkoxy having 1 to 12 carbons or alkenyl having 2 to 12 carbons; ring $A^{31}$ is 1,4-cyclohexylene, 1,4-phenylene, 2-fluoro-1,4-phenylene, 2,6-difluoro-1,4-phenylene, pyridine-2,5-diyl, pyrimidine-2,5-diyl, 1, 3-dioxane-2,5-diyl or tetrahydropyran-2,5-diyl; ring $A^{32}$ and ring $A^{33}$ are independently 1,4-phenylene, 2-fluoro-1,4-phenylene, 1,3-dioxane-2,5-diyl or 2,6-difluoro-1,4-phenylene; $Z^{31}$, $Z^{32}$ and $Z^{33}$ are independently a single bond, ethylene, vinylene, methyleneoxy, carbonyloxy, difluoromethyleneoxy or tetrafluoroethylene; $X^{31}$ and $X^{32}$ are independently hydrogen or fluorine; $Y^{31}$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and $m^3$ is 0, 1 or 2, and when $m^3$ represents 2, a plurality of ring $A^{31}$ and $Z^{31}$ may be identical or different, respectively.

Item 7. The liquid crystal composition according to any one of items 1 to 6, containing at least one compound selected from the group of compounds represented by formula (3-1) to formula (3-15) as the third component:

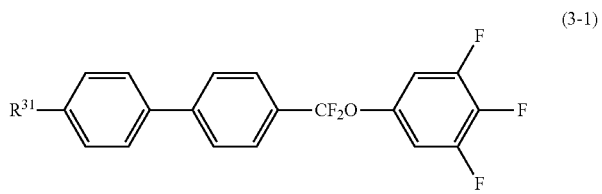
(3-1)

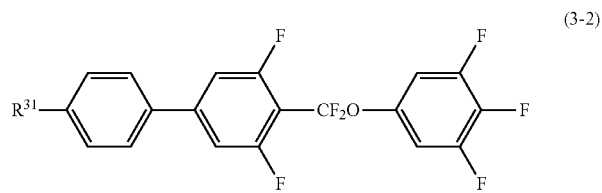
(3-2)

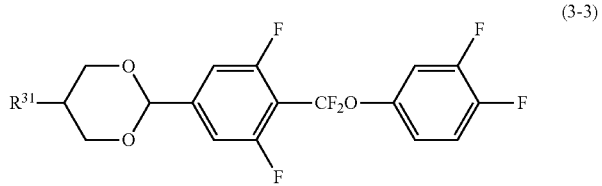
(3-3)

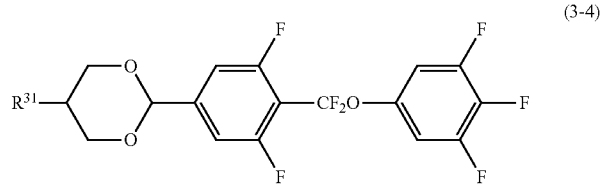
(3-4)

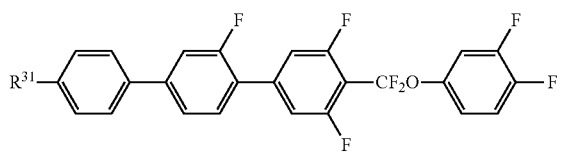
(3-5)

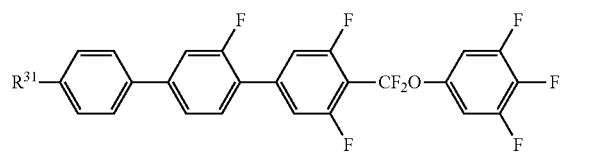
(3-6)

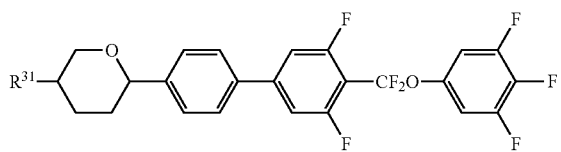
(3-7)

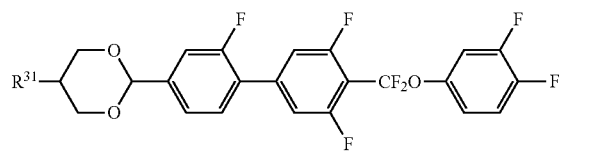
(3-8)

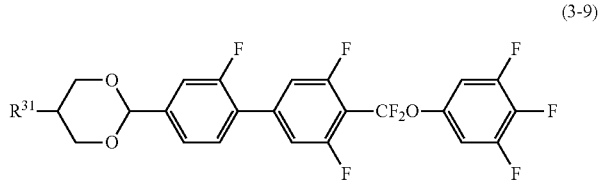
(3-9)

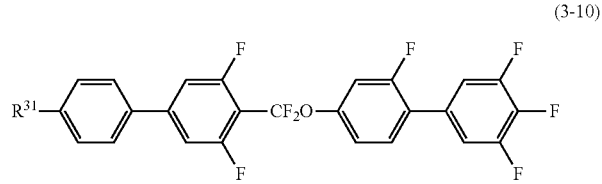
(3-10)

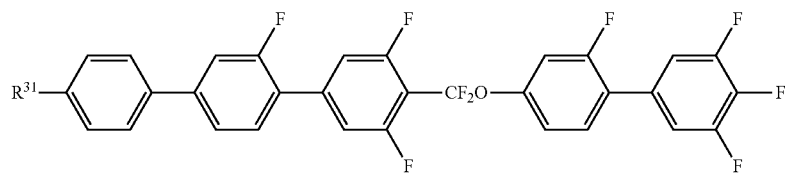

(3-11)

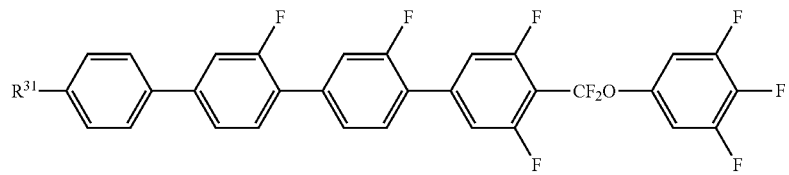

(3-12)

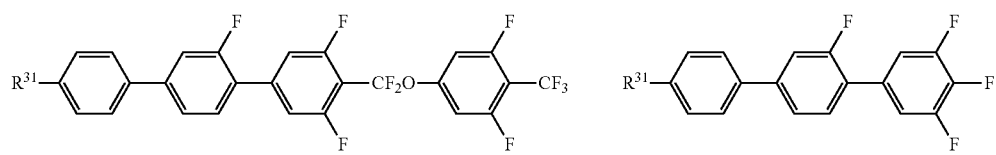

(3-13)

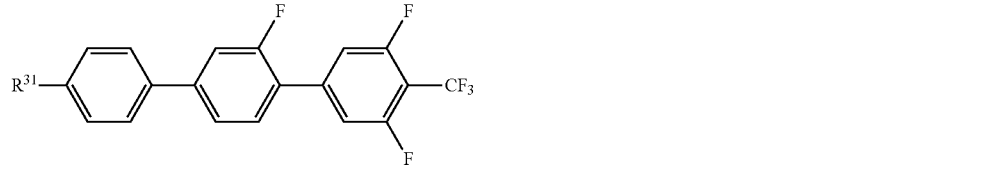

(3-14)

(3-15)

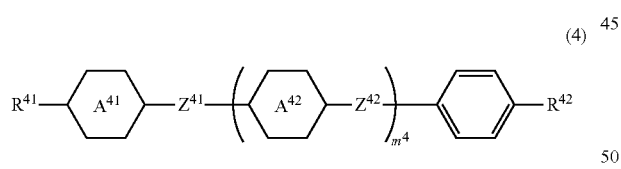

wherein, in the formulas, $R^{31}$ is alkyl having 1 to 12 carbons, alkoxy having 1 to 12 carbons or alkenyl having 2 to 12 carbons.

Item 8. The liquid crystal composition according to any one of items 1 to 7, wherein a proportion of the third component is in the range of 1% by weight to 50% by weight based on the weight of the liquid crystal composition.

Item 9. The liquid crystal composition according to any one of items 1 to 8, further containing at least one compound selected from the group of compounds represented by formula (4) as a fourth component:

$$R^{41}-A^{41}-Z^{41}-\left(A^{42}-Z^{42}\right)_{m^4}-R^{42}$$ (4)

wherein, in formula (4), $R^{41}$ and $R^{42}$ are independently alkyl having 1 to 12 carbons, alkoxy having 1 to 12 carbons or alkenyl having 2 to 12 carbons; ring $A^{41}$ and ring $A^{42}$ are independently 1,4-cyclohexylene, 1,4-phenylene, 2-fluoro-1,4-phenylene, 2,5-difluoro-1,4-phenylene or 2,6-difluoro-1,4-phenylene; $Z^{41}$ is a single bond, ethylene, vinylene, methyleneoxy, carbonyloxy, difluoromethyleneoxy, ethynylene or tetrafluoroethylene; $Z^{42}$ is a single bond, ethylene, vinylene, methyleneoxy, carbonyloxy, difluoromethyleneoxy or tetrafluoroethylene; and $m^4$ is 0, 1 or 2, and when $m^4$ represents 2, a plurality of ring $A^{42}$ and $Z^{42}$ may be identical or different, respectively.

Item 10. The liquid crystal composition according to any one of items 1 to 9, containing at least one compound selected from the group of compounds represented by formula (4-1) to formula (4-13) as the fourth component:

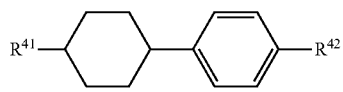

(4-1)

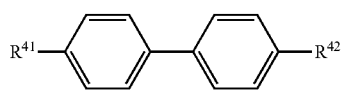

(4-2)

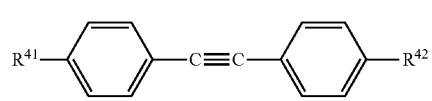

(4-3)

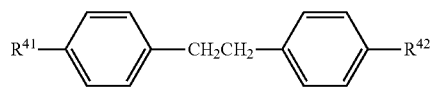

(4-4)

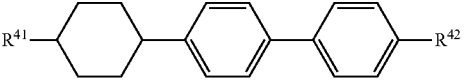

(4-5)

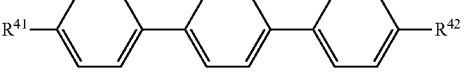

(4-6)

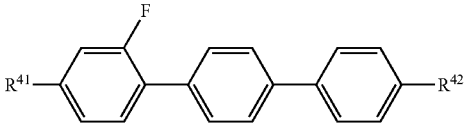

(4-7)

-continued (4-8)
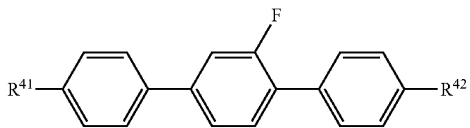

(4-9)
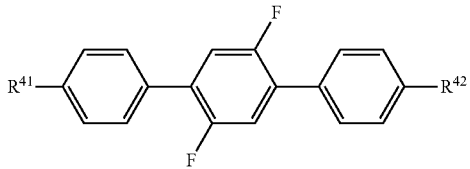

(4-10)
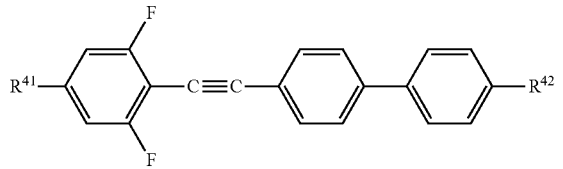

(4-11)
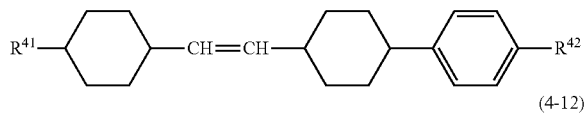

(4-12)
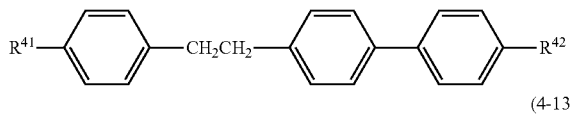

(4-13)
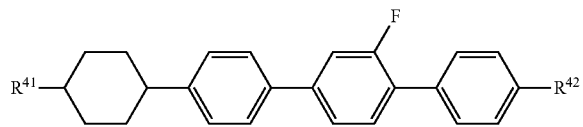

wherein, in the formulas, $R^{41}$ and $R^{42}$ are independently alkyl having 1 to 12 carbons, alkoxy having 1 to 12 carbons or alkenyl having 2 to 12 carbons.

Item 11. The liquid crystal composition according to any one of items 1 to 10, wherein a proportion of the fourth component is in the range of 5% by weight to 55% by weight based on the weight of the liquid crystal composition.

Item 12. The liquid crystal composition according to any one of items 1 to 11, wherein an optical anisotropy (measured at 25° C.) at a wavelength of 589 nanometers is in the range of 0.20 to 0.35, and a dielectric anisotropy (measured at 25° C.) at a frequency of 1 kHz is in the range of 8 to 40.

Item 13. A liquid crystal display device, including the liquid crystal composition according to any one of items 1 to 12.

Item 14. The liquid crystal display device according to item 13, wherein the liquid crystal composition according to any one of items 1 to 12 is encapsulated.

Item 15. The liquid crystal display device according to item 13, wherein the liquid crystal composition according to any one of items 1 to 12 is used in a lens that utilizes for switching between 2D and 3D.

Item 16. Use of the liquid crystal composition according to any one of items 1 to 12 in a liquid crystal display device.

The invention further includes the following items: (a) the composition, further containing at least one of additives such as an optically active compound, an antioxidant, an ultraviolet light absorber, a dye, an antifoaming agent, a polymerizable compound, a polymerization initiator or a polymerization inhibitor; (b) an AM device including the composition; (c) the composition further containing a polymerizable compound, and a polymer sustained alignment (PSA) mode AM device including the composition; (d) a polymer sustained alignment (PSA) mode AM device, wherein the device includes the composition, and the polymerizable compound in the composition is polymerized; (e) a device including the composition and having the PC mode, the TN mode, the STN mode, the ECB mode, the OCB mode, the IPS mode, the VA mode, the FFS mode or the FPAmode; (f) a transmissive device including the composition; (g) use of the composition as the composition having the nematic phase; and (h) use as an optically active composition by adding the optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compounds will be described. Sixth, an additive that may be added to the composition will be described. Last, an application of the composition will be described.

First, the constitution of the component compounds in the composition will be described. The composition of the invention is classified into composition A and composition B. Composition A may further contain any other liquid crystal compound, an additive or the like in addition to the liquid crystal compound selected from compound (1), compound (2-1), compound (2-2), compound (3) and compound (4). "Any other liquid crystal compound" means a liquid crystal compound different from compound (1), compound (2-1), compound (2-2), compound (3) and compound (4). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator and the polymerization inhibitor.

Composition B consists essentially of liquid crystal compounds selected from compound (1), compound (2-1), compound (2-2), compound (3) and compound (4). An expression "essentially" means that the composition may contain the additive, but contains no any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and a symbol "0" means that "a value is zero" or "a value close to zero."

TABLE 2

| Compounds | (1) | (2-1) and (2-2) | (3) | (4) |
|---|---|---|---|---|
| Characteristics of Compound | | | | |
| Maximum temperature | M to L | M to L | M to L | S to L |
| Viscosity | M | M to L | M to L | S to M |
| Optical anisotropy | L | L | M to L | L |
| Dielectric anisotropy | 0 | M to L | M to L | 0 |
| Specific resistance | L | L | L | L |

Upon mixing the component compounds with the composition, the main effects of the component compounds on the characteristics of the composition are as described below. Compound (1) increases the optical anisotropy. Compound (2-1) and compound (2-2) increase the optical anisotropy, and increase the dielectric anisotropy. Compound (3) increases the dielectric anisotropy. Compound (4) increases the optical anisotropy, and increases the maximum temperature or decreases the minimum temperature.

Third, the combination of components in the composition, the preferred proportion of the component compounds and the basis thereof will be described. The combination of components in the composition includes a combination of the first component and the second component, a combination of the first component, the second component and the third component, a combination of the first component, the second component and the fourth component, and a combination of the first component, the second component, the third component and the fourth component. A preferred combination of components in the composition includes a combination of the first component, the second component and the fourth component, and a further preferred combination includes a combination of the first component, the second component, the third component and the fourth component.

A preferred proportion of the first component is about 10% by weight or more for increasing the optical anisotropy or increasing the maximum temperature, and about 50% by weight or less for increasing the dielectric anisotropy based on the weight of the liquid crystal composition. A further preferred proportion is in the range of about 10% by weight to about 45% by weight. A particularly preferred proportion is in the range of about 15% by weight to about 40% by weight.

A preferred proportion of the second component is about 5% by weight or more for increasing the dielectric anisotropy, increasing the optical anisotropy or increasing the maximum temperature, and about 60% by weight or less for decreasing the minimum temperature based on the weight of the liquid crystal composition. A further preferred proportion is in the range of about 5% by weight to about 50% by weight. A particularly preferred proportion is in the range of about 5% by weight to about 45% by weight.

A preferred proportion when the compound represented by formula (2-1) is used as the second component is about 5% by weight or more for increasing the dielectric anisotropy, increasing the optical anisotropy or increasing the maximum temperature, and about 45% by weight or less for decreasing the minimum temperature based on the weight of the liquid crystal composition. A further preferred proportion is in the range of about 5% by weight to 40% by weight. A particularly preferred proportion is in the range of about 5% by weight to 35% by weight.

A preferred proportion when the compound represented by formula (2-2) is used as the second component is about 5% by weight or more for increasing the dielectric anisotropy, increasing the optical anisotropy or increasing the maximum temperature, and about 40% by weight or less for decreasing the minimum temperature based on the weight of the liquid crystal composition. A further preferred proportion is in the range of about 5% by weight to 30% by weight. A particularly preferred proportion is in the range of about 10% by weight to 25% by weight.

A preferred proportion of the third component is about 1% by weight or more for increasing the dielectric anisotropy or increasing the maximum temperature, and about 50% by weight or less for increasing the optical anisotropy or decreasing the minimum temperature based on the weight of the liquid crystal composition. A further preferred proportion is in the range of about 5% by weight to 45% by weight. A particularly preferred proportion is in the range of about 10% by weight to 40% by weight.

A preferred proportion of the fourth component is about 5% by weight or more for increasing the optical anisotropy, and increasing the maximum temperature or decreasing the minimum temperature, and about 55% by weight or less for increasing the dielectric anisotropy based on the weight of the liquid crystal composition. A further preferred proportion is in the range of about 10% by weight to about 55% by weight. A particularly preferred proportion is in the range of about 20% by weight to about 50% by weight.

In the application, "a compound having cyano" means whole of liquid crystal compounds having cyano and also having dielectric anisotropy, in which an inorganic cyano-based compound is excluded. Specific examples of the compound are disclosed in JP S49-095882 A, JP S59-176240 A and JP H4-300861 A.

In view of high stability to ultraviolet light, the composition of the invention preferably contains as few compound having cyano as possible. A proportion of the compound having cyano is preferably less than 3% by weight, further preferably less than 2% by weight, and still further preferably less than 1% by weight based on a total of the liquid crystal composition.

Fourth, the preferred embodiment of the component compounds will be described. $R^{11}$, $R^{12}$, $R^{21}$, $R^{22}$, $R^{31}$, $R^{41}$ and $R^{42}$ are independently alkyl having 1 to 12 carbons, alkoxy having 1 to 12 carbons or alkenyl having 2 to 12 carbons. Preferred $R^{11}$, $R^{12}$, $R^{21}$, $R^{22}$, $R^{31}$, $R^{41}$ or $R^{42}$ is independently alkyl having 1 to 12 carbons for increasing the stability to ultraviolet light or heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl. In the alkenyl, straight-chain alkenyl is preferred to branched-chain alkenyl.

Then, $m^{21}$, $m^{22}$, $m^3$ and $m^4$ are 0, 1 or 2. Preferred $m^{21}$ is 1 for increasing the dielectric anisotropy, increasing the optical anisotropy or increasing the maximum temperature. Preferred $m^{22}$ is 1 for increasing the dielectric anisotropy, increasing the optical anisotropy or increasing the maximum temperature. Preferred $m^3$ is 1 for increasing the dielectric anisotropy or increasing the maximum temperature. Preferred $m^4$ is 0 for decreasing the minimum temperature.

$Z^{11}$, $Z^{21}$, $Z^{22}$, $Z^{23}$, $Z^{24}$ and $Z^{41}$ are independently a single bond, ethylene, vinylene, methyleneoxy, carbonyloxy, difluoromethyleneoxy, ethynylene or tetrafluoroethylene. Herein, at least one of $Z^{21}$ and $Z^{22}$ is ethynylene, and at least one of $Z^{23}$ and $Z^{24}$ is ethynylene. Preferred $Z^{11}$, $Z^{21}$, $Z^{22}$, $Z^{23}$, $Z^{24}$ or $Z^{41}$ is a single bond or ethynylene for increasing the optical anisotropy. $Z^{42}$ is a single bond, ethylene, vinylene, methyleneoxy, carbonyloxy, difluoromethyleneoxy or tetrafluoroethylene. Preferred $Z^{42}$ is a single bond for increasing the optical anisotropy or increasing the specific resistance. $Z^{31}$, $Z^{32}$ and $Z^{33}$ are independently a single bond, ethylene, vinylene, methyleneoxy, carbonyloxy, difluoromethyleneoxy or tetrafluoroethylene. Preferred $Z^{31}$, $Z^{32}$ or $Z^{33}$ is a single bond for increasing the specific resistance.

Ring $A^{11}$, ring $A^{41}$ and ring $A^{42}$ are independently 1,4-cyclohexylene, 1,4-phenylene, 2-fluoro-1,4-phenylene, 2,5-difluoro-1,4-phenylene or 2,6-difluoro-1,4-phenylene. Preferred ring $A^{11}$, ring $A^{41}$ or ring $A^{42}$ is 1,4-phenylene, 2-fluoro-1,4-phenylene, 2,5-difluoro-1,4-phenylene or 2,6-difluoro-1,4-phenylene for increasing the optical anisotropy. Ring $A^{21}$, ring $A^{24}$ and ring $A^{31}$ are independently 1,4-cyclohexylene, 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl. Preferred ring $A^{21}$, ring $A^{24}$ or ring $A^{31}$ is 1,4-phenylene for increasing the optical anisotropy, 1,3-dioxane-2,5-diyl for increasing the dielectric anisotropy and 1,4-cyclohexylene for increasing the maximum temperature. Ring $A^{22}$, ring $A^{23}$, ring $A^{25}$ and ring $A^{26}$ are independently 1,4-phenylene, 2-fluoro-1,4-phenylene or 2,6-difluoro-1,4-phenylene. Ring $A^{32}$ and ring $A^{33}$ are independently 1,4-phenylene, 2-fluoro-1,4-phenylene, 1,3-dioxane-2,5-diyl or 2,6-difluoro-1,4-phenylene. Preferred ring $A^{22}$, ring $A^{23}$, ring $A^{25}$, ring $A^{26}$, ring $A^{32}$ or ring $A^{33}$ is 1,4-phenylene, 2-fluoro-1,4-phenylene or 2,6-difluoro-1,4-phenylene for increasing the optical anisotropy or decreasing the minimum temperature. With regard to a configuration of 1,4-cyclohexylene, trans is preferred to cis for increasing the maximum temperature. Tetrahydropyran-2,5-diyl includes:

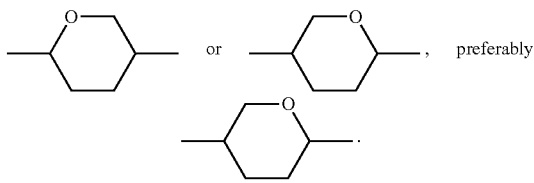

$X^{11}$, $X^{21}$, $X^{22}$, $X^{23}$, $X^{24}$, $X^{31}$ and $X^{32}$ are independently hydrogen or fluorine. Preferred $X^{11}$ is fluorine for decreasing the minimum temperature, and preferred $X^{21}$, $X^{22}$, $X^{23}$, $X^{24}$, $X^{31}$ or $X^{32}$ is fluorine for increasing the dielectric anisotropy.

$Y^{21}$, $Y^{22}$ and $Y^{31}$ are independently fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen. Preferred $Y^{21}$, $Y^{22}$ or $Y^{31}$ is fluorine for increasing the dielectric anisotropy.

Fifth, the preferred component compounds will be described. Preferred compound (1) includes compound (1-1) to compound (1-13) described below.

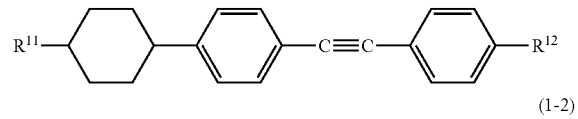
(1-1)

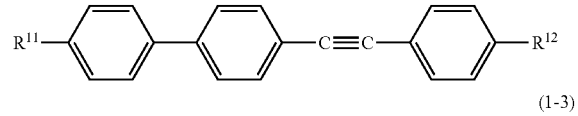
(1-2)

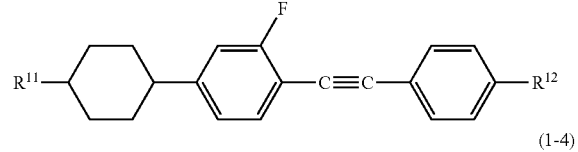
(1-3)

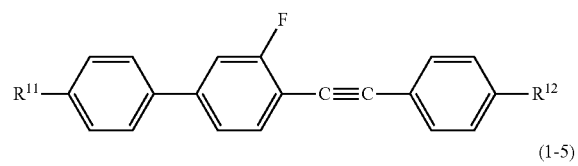
(1-4)

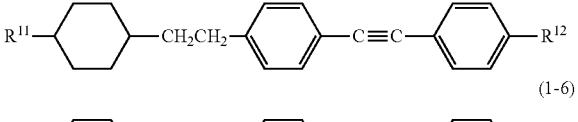
(1-5)

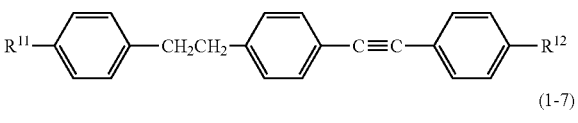
(1-6)

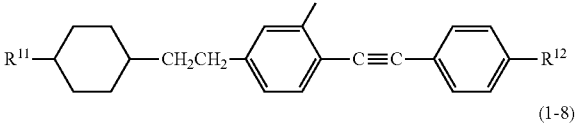
(1-7)

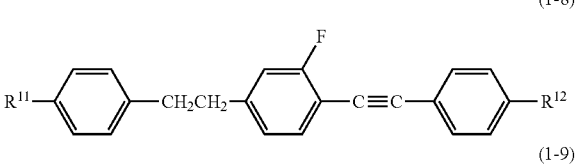
(1-8)

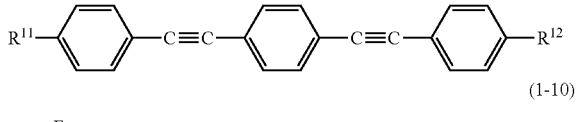
(1-9)

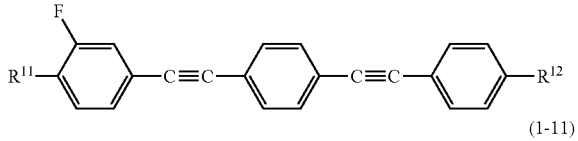
(1-10)

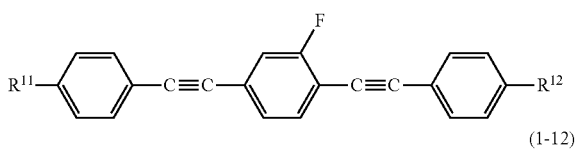
(1-11)

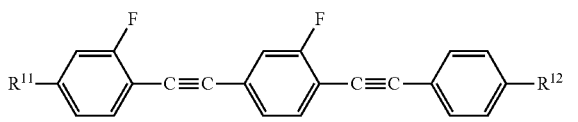
(1-12)

-continued
(1-13)
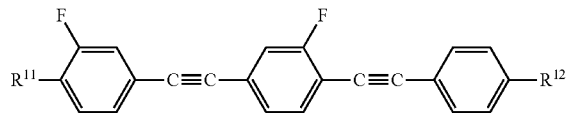
In the compounds, at least one of the first components preferably includes compound (1-3), compound (1-4) or compound (1-5). At least two of the first components preferably includes a combination of compound (1-3) and compound (1-4), or a combination of compound (1-4) and compound (1-5).
Preferred compound (2-1) includes compound (2-1-1) to compound (2-1-14) described below.
(2-1-1)
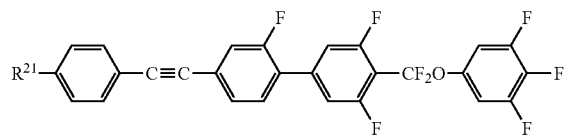
(2-1-2)
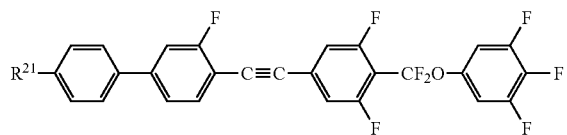
(2-1-3)
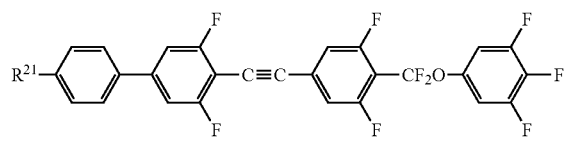
(2-1-4)
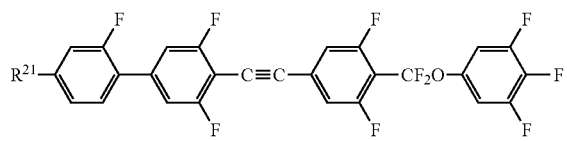
(2-1-5)
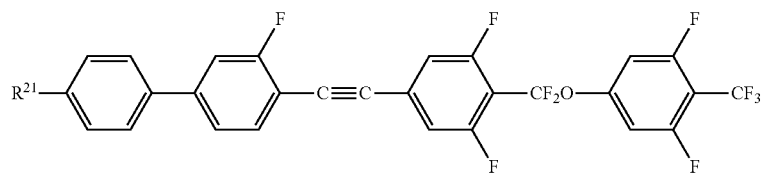
(2-1-6)
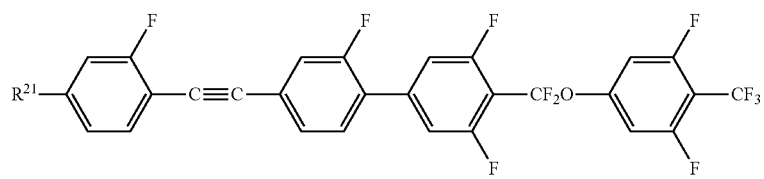
(2-1-7)
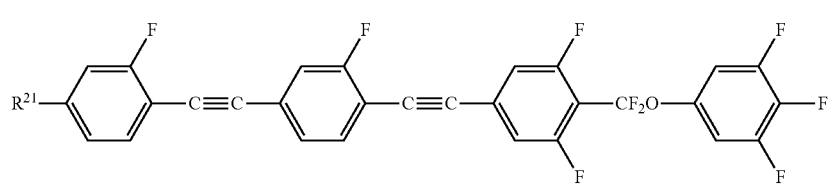
(2-1-8)
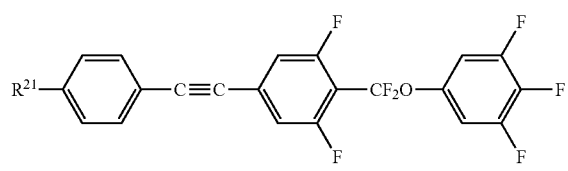
(2-1-9)
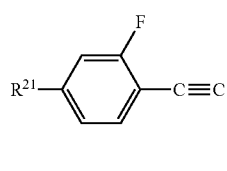
(2-1-10)
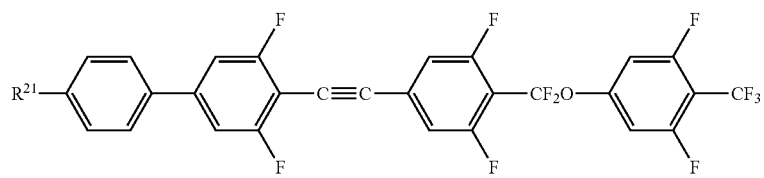

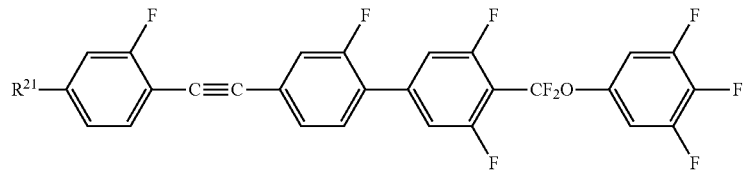
(2-1-11)

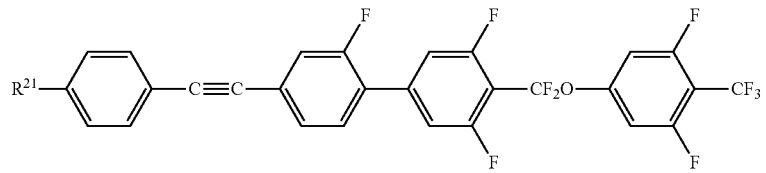
(2-1-12)

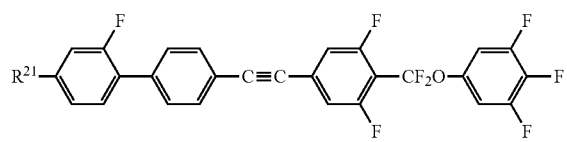
(2-1-13)

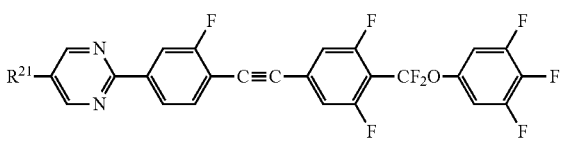
(2-1-14)

Preferred compound (2-2) includes compound (2-2-1) to compound (2-2-2) described below.

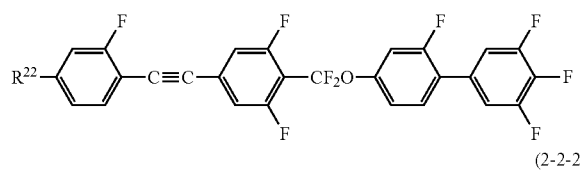
(2-2-1)

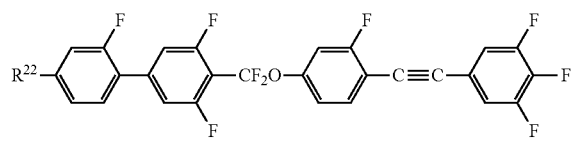
(2-2-2)

In the compounds, at least one of the second components preferably includes compound (2-1-1), compound (2-1-2), compound (2-1-5) or compound (2-2-1). At least two of the second components preferably includes a combination of compound (2-1-1) and compound (2-2-1), a combination of compound (2-1-2) and compound (2-2-1), or a combination of compound (2-1-5) and compound (2-2-1).

Preferred compound (3) includes compound (3-1) to compound (3-15) described below.

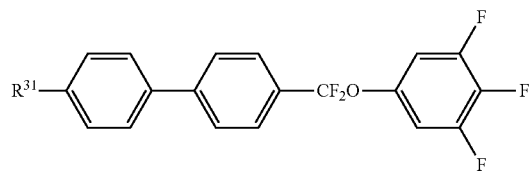
(3-1)

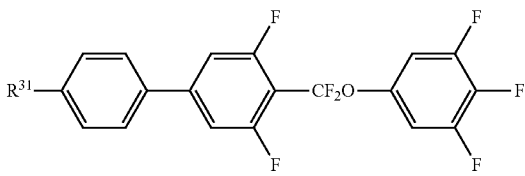
(3-2)

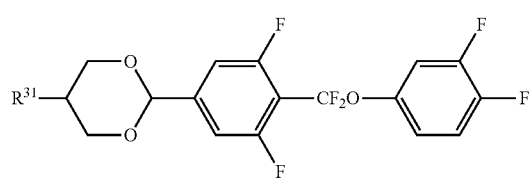
(3-3)

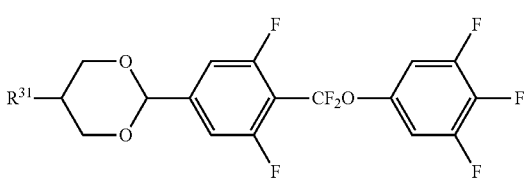
(3-4)

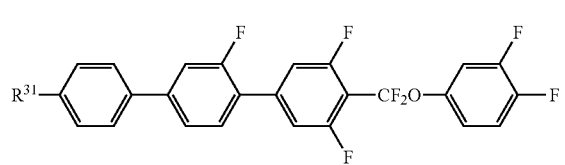
(3-5)

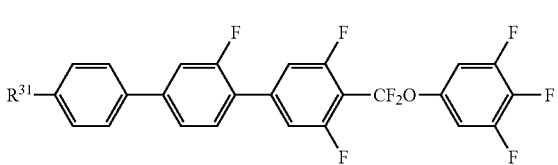
(3-6)

In the compounds, at least one of the third components preferably includes compound (3-2), compound (3-5), compound (3-6) or compound (3-10). At least two of the third components preferably includes a combination of compound (3-2) and compound (3-6), a combination of compound (3-5) and compound (3-6), or a combination of compound (3-6) and compound (3-10).

In compound (3), a compound in which at least one of $Z^{31}$, $Z^{32}$ and $Z^{33}$ is difluoromethyleneoxy is further preferred.

Preferred compound (4) includes compound (4-1) to compound (4-13) described below.

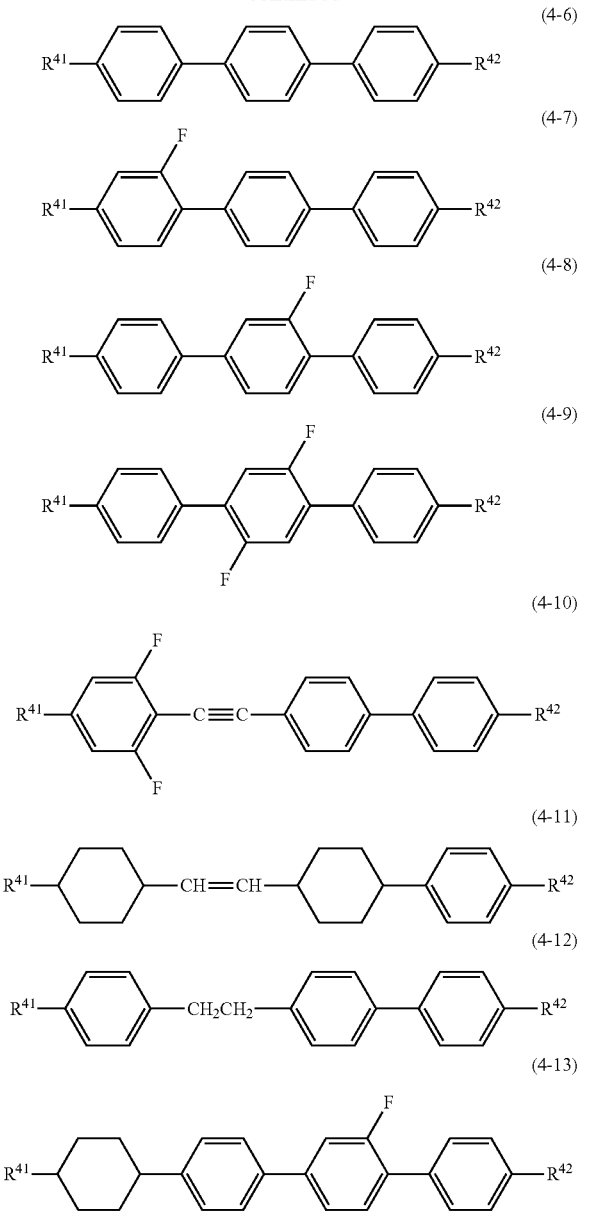

In the compounds, at least one of the fourth components preferably includes compound (4-3) or compound (4-13). At least two of the fourth components preferably includes a combination of compound (4-3) and compound (4-13).

Sixth, the additive that may be added to the composition will be described. Such an additive includes the optically active compound, the antioxidant, the ultraviolet light absorber, the dye, the antifoaming agent, the polymerizable compound, the polymerization initiator and the polymerization inhibitor. Hereinafter, a mixing proportion of the additives means a proportion (weight) based on the weight of the liquid crystal composition unless otherwise noted.

The optically active compound is added to the composition for the purpose of inducing a helical structure in a liquid crystal to give a twist angle. Examples of such a compound include compound (5-1) to compound (5-5). A preferred proportion of the optically active compound is about 5% by weight or less. A further preferred proportion is in the range of about 0.01% by weight to about 2% by weight.

The antioxidant is added to the composition for preventing a decrease in the specific resistance caused by heating in air, or for maintaining the large voltage holding ratio at room temperature and also at the temperature close to the maximum temperature even after the device has been used for a long period of time. Specific examples of a preferred antioxidant include compound (6) in which t is an integer from 1 to 9.

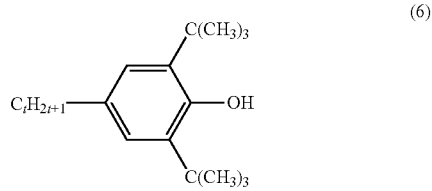

In compound (6), preferred t is 1, 3, 5, 7 or 9. Further preferred t is 7. Compound (6) in which t is 7 is effective in maintaining the large voltage holding ratio at room temperature and also at the temperature close to the maximum temperature even after the device has been used for a long period of time because such compound (6) has a small volatility. A preferred proportion of the antioxidant is about 50 ppm or more for achieving an effect thereof, and about 600 ppm or less for avoiding a decrease in the maximum temperature or avoiding an increase in the minimum temperature. A further preferred proportion is in the range of about 100 ppm to about 300 ppm.

Specific examples of a preferred ultraviolet light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding a decrease in the maximum temperature or avoiding an increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing a poor display. A further preferred proportion is in the range of about 1 ppm to about 500 ppm.

The polymerizable compound is added to the composition to be adapted for a polymer sustained alignment (PSA) mode device. Specific examples of a preferred polymerizable compound include a compound having a polymerizable group such as acrylate, methacrylate, a vinyl compound, a vinyloxy compound, propenyl ether, an epoxy compound (oxirane, oxetane) and vinyl ketone. Further preferred examples include an acrylate derivative or a methacrylate derivative. A preferred proportion of the polymerizable compound is about 0.05% by weight or more for achieving an effect thereof, and about 10% by weight or less for preventing a poor display. A further preferred proportion is in the range of about 0.1% by weight to about 2% by weight. The polymerizable compound is polymerized by irradiation with ultraviolet light. The polymerizable compound may be polymerized in the presence of an initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1 part by weight to about 5 parts by weight based on 100 parts by weight of the weight of the polymerizable compound. A further preferred proportion is in the range of about 1 part by weight to about 3 parts by weight.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

Last, the application of the composition will be described. The composition of the invention mainly has a minimum temperature of about −10° C. or lower, a maximum temperature of about 70° C. or higher, and an optical anisotropy (at a wavelength of 589 nanometers; at 25° C.) is in the range of about 0.20 to about 0.35. A device including the composition has the large voltage holding ratio. The composition is suitable for use in the AM device. The composition is particularly suitable for use in a transmissive AM device. The composition having optical anisotropy in the range of about 0.15 to about 0.20, and further the composition having optical anisotropy in the range of about 0.35 to about 0.40 may be prepared by controlling the proportion of the component compounds or by mixing any other liquid crystal compound. The composition can be used as the composition having the nematic phase and as the optically active composition by adding the optically active compound.

The composition can be used for the AM device. The composition can also be used for a PM device. The composition can also be used for the AM device and the PM device each having a mode such as the PC mode, the TN mode, the STN mode, the ECB mode, the OCB mode, the IPS mode, the FFS mode, the VA mode or the FPA mode. Use for the AM device having the TN mode, the OCB mode, the IPS mode or the FFS mode is particularly preferred. In the AM device having the IPS mode or the FFS mode, alignment of liquid crystal molecules when no voltage is applied may be parallel or vertical to a glass substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is formed in the composition.

EXAMPLES

The invention will be described in greater detail by way of Examples. However, the invention is not limited by the Examples. The invention also includes a mixture in which at least two compositions in Examples were mixed. The thus prepared compound was identified by methods such as an NMR analysis. Characteristics of the compound and the composition were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase; nonpolar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of liquid crystal compounds is detected by gas chromatograph (FID). An area ratio of each peak in the gas chromatogram corresponds to the ratio (weight ratio) of the liquid crystal compound. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of a composition were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitates at the ratio thereof at 25° C., a ratio of the compound to the base liquid crystal was changed step by step in the order of (10% by weight: 90% by weight), (5% by weight: 95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

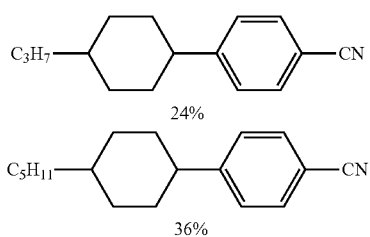

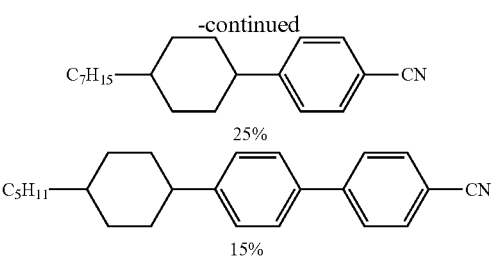

Measuring method: Characteristics were measured according to the methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured.

(2) Minimum temperature of nematic phase ($T_C$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$<−20° C.

(3) Viscosity (bulk viscosity; η; measured at 20° C.; mPa·s): For measurement, a cone-plate (E type) rotational viscometer made by Tokyo Keiki, Inc. was used.

(4) Viscosity (rotational viscosity; γ1; measured at 20° C.; mPa·s): Measurement was carried out according to a method described in M. Imai et al., Molecular Crystals and Liquid Crystals, Vol. 259, p. 37 (1995). A sample was put in a TN device in which a twist angle was 0 degree and a distance (cell gap) between two glass substrates was 5 micrometers. Voltage was applied stepwise to the device in the range of 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. A value of dielectric anisotropy required for the calculation was determined using the device by which the rotational viscosity was measured and by the method described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: $\Delta n = n\| - n\perp$. In a mode in which optical change by a Kerr effect is utilized, a product of the optical anisotropy and dielectric anisotropy is preferably larger, and therefore the optical anisotropy is preferably as larger as possible. The optical anisotropy is preferably in the range of 0.20 to 0.35, and further preferably in the range of 0.23 to 0.32.

(6) Dielectric anisotropy ($\Delta\varepsilon$; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant ($\varepsilon\|$) of liquid crystal molecules in a major axis direction was measured. Sine waves (0.5 V, 1 kHz) were applied to the device, and after 2 seconds, a dielectric constant ($\varepsilon\perp$) of liquid crystal molecules in a minor axis direction was measured. A value of dielectric anisotropy was calculated from an equation: $\Delta\varepsilon = \varepsilon\| - \varepsilon\perp$. The dielectric anisotropy is preferably larger for decreasing drive voltage. In particular, in a mode in which an electric field that applies to a liquid crystal composition is limited due to polymer stabilization, encapsulation or the like, the drive voltage tends to become high, and therefore the dielectric anisotropy is preferably as larger as possible. Moreover, in the mode in which the optical change by the Kerr effect is utilized, the product of the optical anisotropy and the dielectric anisotropy is preferably larger, and therefore the dielectric anisotropy is preferably as larger as possible. The dielectric anisotropy is preferably in the range of 8 to 40, and further preferably in the range of 15 to 30.

(7) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/$\Delta n$ ($\mu$m) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 90% transmittance.

(8) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with light for 20 minutes. A light source was an ultra-high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has large stability to ultraviolet light. A value of VHR-3 is preferably 90% or more, and further preferably 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has large stability to heat.

(12) Response time ($\tau$; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally white mode TN device in which a distance (cell gap) between two glass substrates was 5.0 micrometers and a twist angle was 80 degrees. A voltage (rectangular waves; 60 Hz, 5 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time ($\tau r$; millisecond) was expressed in terms of time required for a change from 90% transmittance to 10% transmittance. A fall time ($\tau f$; millisecond) was expressed in terms of time required for a change from 10% transmittance to 90% transmittance. A response time was expressed by a sum of the rise time and the fall time thus obtained.

(13) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge of 0 V to 20 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku in Japanese; Nikkan Kogyo Shimbun, Ltd.) and values of K11 and K33 were obtained from equation (2.99). Next, K22 was calculated using the previously determined values of K11 and K33 in equation (3.18) on page 171. Elastic constant K was expressed in terms of a mean value of the thus determined K11, K22 and K33.

(14) Specific resistance ($\rho$; measured at 25° C.; $\Omega$cm): Into a vessel equipped with electrodes, 1.0 milliliter of a sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(15) Helical pitch (P; measured at room temperature; $\mu$m): A helical pitch was measured according to a wedge method. Refer to page 196 in "Handbook of Liquid Crystals (Ekisho Binran in Japanese)" (issued in 2000, Maruzen Co., Ltd.). A sample was injected into a wedge cell and left to stand at room temperature for 2 hours, and then a gap (d2−d1) between disclination lines was observed by a polarizing microscope (trade name: MM40/60 Series, Nikon Corporation). A helical pitch (P) was calculated according to the following equation in which an angle of the wedge cell was expressed as θ: P=2×(d2−d1)×tan θ.

(16) Dielectric anisotropy (ε⊥; measured at 25° C.) in minor axis direction: A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in the minor axis direction was measured.

The compounds in Examples were expressed using symbols according to definitions in Table 3 described below. In Table 3, the configuration of 1,4-cyclohexylene is trans. A parenthesized number next to a symbolized compound corresponds to the number of the compound. A symbol (−) means any other liquid crystal compound. A proportion (percentage) of the liquid crystal compound is expressed in terms of weight percent (% by weight) based on the weight of the liquid crystal composition. Values of the characteristics of the composition were summarized in the last part.

TABLE 3

| Method for Description of Compounds using Symbols |
| :---: |
| R—(A$_1$)—Z$_1$—.....—Z$_n$—(A$_n$)—R' |

| 1) Left-terminal Group R— | Symbol |
| :---: | :---: |
| C$_n$H$_{2n+1}$— | n- |
| C$_n$H$_{2n+1}$O— | nO- |
| C$_m$H$_{2m+1}$OC$_n$H$_{2n}$— | mOn- |
| CH$_2$=CH— | V— |
| C$_n$H$_{2n+1}$—CH=CH— | nV- |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF- |
| CF$_2$=CH—C$_n$H$_{2n}$— | VFFn- |

| 2) Right-terminal Group —R' | Symbol |
| :---: | :---: |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | -Vn |
| —C$_n$H$_{2n}$—CH=CH$_2$ | -nV |
| —C$_n$H$_{2n}$—CH=CH—C$_m$H$_{2m+1}$ | -nVm |
| —CH=CF$_2$ | -VFF |
| —COOCH$_3$ | -EMe |
| —F | —F |
| —Cl | —CL |
| —OCF$_3$ | —OCF3 |
| —CF$_3$ | —CF3 |
| —CN | —C |
| —OCH=CH—CF$_2$H | —OVCF2H |
| —OCH=CH—CF$_3$ | —OVCF3 |

| 3) Bonding Group —Z$_n$— | Symbol |
| :---: | :---: |
| —C$_2$H$_4$— | 2 |
| —COO— | E |
| —CH=CH— | V |
| —C≡C— | T |
| —CF$_2$O— | X |
| —CH$_2$O— | 1O |

| 4 Ring Structure —A$_n$— | Symbol |
| :---: | :---: |
| 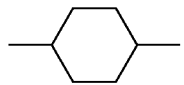 | H |
| 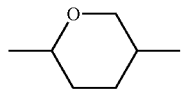 | Dh |
| 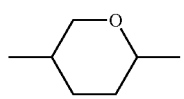 | dh |
| 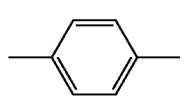 | B |

TABLE 3-continued
| Structure | Symbol |
|---|---|
| (2-fluoro-1,4-phenylene) | B(F) |
| (3-fluoro-1,4-phenylene) | B(2F) |
| (2,3-difluoro-1,4-phenylene) | B(F,F) |
| (3,5-difluoro-1,4-phenylene) | B(2F,5F) |
| (1,3-dioxane-2,5-diyl) | G |
| (pyrimidine-2,5-diyl) | Py |
5) Examples of Description
Example 1. 3-BB(F)TB-2
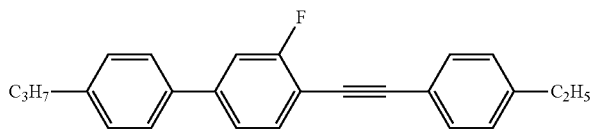
Example 2. 3-BB(F)B(F,F)-F
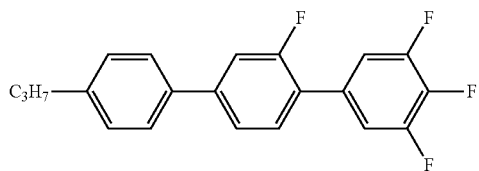
Example 3. 4-BB(F)B(F,F)XB(F,F)-F
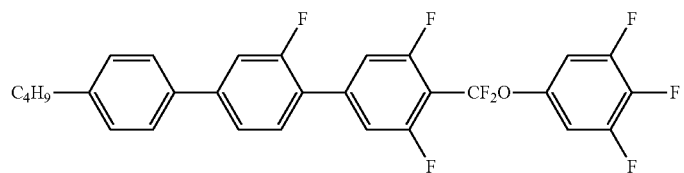

TABLE 3-continued

Example 4. 5-BB(F)TB(F,F)XB(F,F)-F

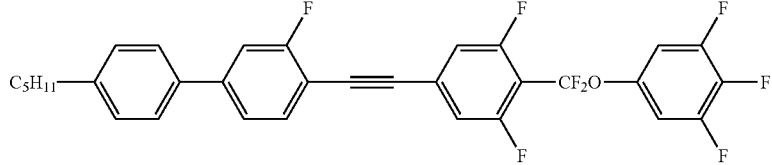

Comparative Example 1

As a Comparative Example, a liquid crystal composition in which no compound represented by formula (2-1) or formula (2-2) was used was prepared.

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 3-H2BTB-3 | (1-5) | 3% |
| 3-H2BTB-4 | (1-5) | 3% |
| 3-BB(F,F)XB(F,F) —F | (3-2) | 9% |
| 3-BB(F)B(F,F)XB(F) —F | (3-5) | 3% |
| 3-BB(F)B(F,F)XB(F,F) —F | (3-6) | 2% |
| 4-BB(F)B(F,F)XB(F,F) —F | (3-6) | 7% |
| 5-BB(F)B(F,F)XB(F,F) —F | (3-6) | 7% |
| 3-BB(F,F)XB(F)B(F,F) —F | (3-10) | 6% |
| 3-BB(F)B(F,F) —F | (3-14) | 3% |
| 2-BTB—O1 | (4-3) | 7.8% |
| 3-BTB—O1 | (4-3) | 7.8% |
| 4-BTB—O1 | (4-3) | 7.8% |
| 4-BTB—O2 | (4-3) | 7.8% |
| 5-BTB—O1 | (4-3) | 7.8% |

NI = 90.0° C.;
Tc < −20° C.;
Δn = 0.246;
Δε = 9.4;
Vth = 1.88 V;
η = 42.7 mPa · s.

Example 1

A liquid crystal composition was prepared by which a compound being an essential component of the invention represented by formula (2-1) or formula (2-2) was used in place of the compound represented by formula (3) in Comparative Example 1.

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 3-H2BTB-3 | (1-5) | 3% |
| 3-H2BTB-4 | (1-5) | 3% |
| 5-BB(F)TB(F,F)XB(F,F) —F | (2-1-2) | 5% |
| 5-BB(F)TB(F,F)XE(F,F) —CF3 | (2-1-5) | 5% |
| 4-B(F)TB(F,F)XB(F)B(F,F) —F | (2-2-1) | 7% |
| 5-B(F)TB(F,F)XB(F)B(F,F) —F | (2-2-1) | 7% |
| 3-BB(F)B(F,F)XB(F,F) —F | (3-6) | 2% |
| 4-BB(F)B(F,F)XB(F,F) —F | (3-6) | 6% |
| 5-BB(F)B(F,F)XB(F,F) —F | (3-6) | 5% |
| 2-BTB—O1 | (4-3) | 7.8% |
| 3-BTB—O1 | (4-3) | 7.8% |
| 4-BTB—O1 | (4-3) | 7.8% |
| 4-BTB—O2 | (4-3) | 7.8% |
| 5-BTB—O1 | (4-3) | 7.8% |

NI = 103.1° C.;
Tc < −20° C.;
Δn = 0.267;
Δε = 13.6;
Vth = 1.50 V;
η = 32.3 mPa · s.

A liquid crystal composition having high NI, large Δn, large Δε, small Vth and small η was able to prepare by changing part of the compound represented by formula (3) in Comparative Example 1 to a compound being an essential component of the invention represented by formula (2-1) or formula (2-2).

Example 2

| | | |
|---|---|---|
| 3-HB(F)TB-2 | (1-3) | 5% |
| 3-HB(F)TB-3 | (1-3) | 5% |
| 3-HB(F)TB-4 | (1-3) | 4% |
| 3-H2BTB-2 | (1-5) | 4% |
| 4-BTB(F)B(F,F)XB(F,F) —F | (2-1-1) | 5% |
| 5-BTB(F)B(F,F)XB(F,F) —F | (2-1-1) | 5% |
| 3-BB(F,F)XB(F,F) —F | (3-2) | 9% |
| 3-BB(F)B(F,F)XB(F) —F | (3-5) | 3% |
| 3-BB(F)B(F,F)XB(F,F) —F | (3-6) | 2% |
| 4-BB(F)B(F,F)XB(F,F) —F | (3-6) | 7% |
| 5-BB(F)B(F,F)XB(F,F) —F | (3-6) | 7% |
| 3-BB(F,F)XB(F)B(F,F) —F | (3-10) | 6% |
| 3-BB(F)B(F,F) —F | (3-14) | 3% |
| 2-BTB—O1 | (4-3) | 7% |
| 3-BTB—O1 | (4-3) | 7% |
| 4-BTB—O1 | (4-3) | 7% |
| 4-BTB—O2 | (4-3) | 7% |
| 5-BTB—O1 | (4-3) | 7% |

NI = 90.3° C.;
Tc < −10° C.;
Δn = 0.248;
Δε = 14.2;
Vth = 1.57 V.

Example 3

| | | |
|---|---|---|
| 3-HB(F)TB-2 | (1-3) | 5% |
| 3-HB(F)TB-3 | (1-3) | 5% |
| 3-H2BTB-2 | (1-5) | 4% |
| 3-H2BTB-3 | (1-5) | 3% |
| 4-BB(F)TB(F,F)XB(F,F) —F | (2-1-2) | 5% |
| 5-BB(F)TB(F,F)XB(F,F) —F | (2-1-2) | 5% |
| 3-BB(F,F)XB(F,F) —F | (3-2) | 9% |
| 3-BB(F)B(F,F)XB(F) —F | (3-5) | 3% |
| 3-BB(F)B(F,F)XB(F,F) —F | (3-6) | 2% |
| 4-BB(F)B(F,F)XB(F,F) —F | (3-6) | 7% |

-continued

| | | |
|---|---|---|
| 5-BB(F)B(F,F)XB(F,F)—F | (3-6) | 7% |
| 3-BB(F,F)XB(F)B(F,F)—F | (3-10) | 6% |
| 3-BB(F)B(F,F)—F | (3-14) | 3% |
| 2-BTB—O1 | (4-3) | 7.2% |
| 3-BTB—O1 | (4-3) | 7.2% |
| 4-BTB—O1 | (4-3) | 7.2% |
| 4-BTB—O2 | (4-3) | 7.2% |
| 5-BTB—O1 | (4-3) | 7.2% |

NI = 90.3° C.;
Tc < −10° C.;
Δn = 0.252;
Δε = 15.1;
Vth = 1.61 V.

Example 4

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 5-BTB(F)B(F,F)XB(F,F)—F | (2-1-1) | 5% |
| 5-BB(F)TB(F,F)XB(F,F)—F | (2-1-2) | 5% |
| 3-BB(F,F)XB(F,F)—F | (3-2) | 9% |
| 3-BB(F)B(F,F)XB(F)—F | (3-5) | 3% |
| 3-BB(F)B(F,F)XB(F,F)—F | (3-6) | 2% |
| 4-BB(F)B(F,F)XB(F,F)—F | (3-6) | 7% |
| 5-BB(F)B(F,F)XB(F,F)—F | (3-6) | 7% |
| 3-BB(F,F)XB(F)B(F,F)—F | (3-10) | 6% |
| 3-BB(F)B(F,F)—F | (3-14) | 3% |
| 2-BTB—O1 | (4-3) | 7% |
| 3-BTB—O1 | (4-3) | 7% |
| 4-BTB—O1 | (4-3) | 7% |
| 4-BTB—O2 | (4-3) | 7% |
| 5-BTB—O1 | (4-3) | 7% |

NI = 90.9° C.;
Tc < −10° C.;
Δn = 0.249;
Δε = 14.5;
Vth = 1.61 V.

Example 5

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 4% |
| 4-BB(F,F)TB(F,F)XB(F,F)—F | (2-1-3) | 5% |
| 5-BB(F,F)TB(F,F)XB(F,F)—F | (2-1-3) | 5% |
| 3-BB(F,F)XB(F,F)—F | (3-2) | 9% |
| 3-BB(F)B(F,F)XB(F)—F | (3-5) | 3% |
| 3-BB(F)B(F,F)XB(F,F)—F | (3-6) | 2% |
| 4-BB(F)B(F,F)XB(F,F)—F | (3-6) | 7% |
| 5-BB(F)B(F,F)XB(F,F)—F | (3-6) | 7% |
| 3-BB(F)XB(F)B(F,F)—F | (3-10) | 6% |
| 3-BB(F)B(F,F)—F | (3-14) | 3% |
| 2-BTB—O1 | (4-3) | 6.8% |
| 3-BTB—O1 | (4-3) | 6.8% |
| 4-BTB—O1 | (4-3) | 6.8% |
| 4-BTB—O2 | (4-3) | 6.8% |
| 5-BTB—O1 | (4-3) | 6.8% |

NI = 90.6° C.;
Tc < −10° C.;
Δn = 0.248;
Δε = 15.2;
Vth = 1.55 V.

Example 6

| | | |
|---|---|---|
| 3-BB(F)TB-2 | (1-4) | 8% |
| 3-BB(F)TB-3 | (1-4) | 8% |
| 3-BB(F)TB-4 | (1-4) | 8% |
| 5-BTB(F)B(F,F)XB(F,F)—F | (2-1-1) | 6% |
| 5-SB(F)TB(F,F)XB(F,F)—F | (2-1-2) | 7% |
| 3-BB(F)B(F,F)XB(F)—F | (3-5) | 3% |
| 3-BB(F)B(F,F)XB(F,F)—F | (3-6) | 2% |
| 4-BB(F)B(F,F)XB(F,F)—F | (3-6) | 7% |
| 5-BB(F)B(F,F)XB(F,F)—F | (3-6) | 7% |
| 3-BB(F)B(F,F)—F | (3-14) | 3% |
| 2-BTB—O1 | (4-3) | 8.2% |
| 3-BTB—O1 | (4-3) | 8.2% |
| 4-BTB—O1 | (4-3) | 8.2% |
| 4-BTB—O2 | (4-3) | 8.2% |
| 5-BTB—O1 | (4-3) | 8.2% |

NI = 106.0° C.;
Tc < −10° C.;
Δn = 0.300;
Δε = 10.6;
Vth = 2.14 V.

Example 7

| | | |
|---|---|---|
| 3-HB(F)TB-2 | (1-3) | 6% |
| 3-HB(F)TB-3 | (1-3) | 5% |
| 3-HB(F)TB-4 | (1-3) | 5% |
| 3-H2BTB-2 | (1-5) | 4% |
| 4-B(F)B(F,F)TB(F,F)XB(F,F)—F | (2-1-4) | 5% |
| 5-B(F)B(F,F)TB(F,F)XB(F,F)—F | (2-1-4) | 5% |
| 3-BB(F,F)XB(F,F)—F | (3-2) | 9% |
| 3-BB(F)B(F,F)XB(F)—F | (3-5) | 3% |
| 3-BB(F)B(F,F)XB(F,F)—F | (3-6) | 2% |
| 4-BB(F)B(F,F)XB(F,F)—F | (3-6) | 7% |
| 5-BB(F)B(F,F)XB(F,F)—F | (3-6) | 7% |
| 3-BB(F)XB(F)B(F,F)—F | (3-10) | 6% |
| 3-BB(F)B(F,F)—F | (3-14) | 3% |
| 2-BTB—O1 | (4-3) | 6.6% |
| 3-BTB—O1 | (4-3) | 6.6% |
| 4-BTB—O1 | (4-3) | 6.6% |
| 4-BTB—O2 | (4-3) | 6.6% |
| 5-BTB—O1 | (4-3) | 6.6% |

NI = 90.1° C.;
Tc < −10° C.;
Δn = 0.246;
Δε = 15.3;
Vth = 1.49 V.

Example 8

| | | |
|---|---|---|
| 3-BB(F)TB-2 | (1-4) | 8% |
| 3-BB(F)TB-3 | (1-4) | 8% |
| 3-BB(F)TB-4 | (1-4) | 8% |
| 5-BE(F)TB(F,F)XB(F,F)—F | (2-1-2) | 7% |
| 5-BB(F,F)TB(F,F)XB(F,F)—F | (2-1-3) | 6% |
| 3-BB(F,F)XB(F,F)—F | (3-2) | 2% |
| 3-BB(F)B(F,F)XB(F)—F | (3-5) | 3% |
| 3-BB(F)B(F,F)XB(F,F)—F | (3-6) | 2% |
| 4-BB(F)B(F,F)XB(F,F)—F | (3-6) | 8% |
| 5-BB(F)B(F,F)XB(F,F)—F | (3-6) | 7% |
| 2-BTB—O1 | (4-3) | 8.2% |
| 3-BTB—O1 | (4-3) | 8.2% |
| 4-BTB—O1 | (4-3) | 8.2% |

-continued

| | | |
|---|---|---|
| 4-BTB—O2 | (4-3) | 8.2% |
| 5-BTB—O1 | (4-3) | 8.2% |

NI = 103.5° C.;

Tc < −10° C.;

Δn = 0.298;

Δε = 11.2;

Vth = 1.97 V.

Example 9

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 4% |
| 4-BB(F)TB(F,F)XB(F,F) —CF3 | (2-1-5) | 5% |
| 5-BB(F)TB(F,F)XB(F,F) —CF3 | (2-1-5) | 5% |
| 3-BB(F,F)XB(F,F) —F | (3-2) | 9% |
| 3-BB(F)B(F,F)XB(F) —F | (3-5) | 3% |
| 3-BB(F)B(F,F)XB(F,F) —F | (3-6) | 2% |
| 4-BB(F)B(F,F)XB(F,F) —F | (3-6) | 7% |
| 5-BB(F)B(F,F)XB(F,F) —F | (3-6) | 7% |
| 3-BB(F,F)XB(F)B(F,F) —F | (3-10) | 6% |
| 3-BB(F)B(F,F) —F | (3-14) | 3% |
| 2-BTB—O1 | (4-3) | 6.8% |
| 3-BTB—O1 | (4-3) | 6.8% |
| 4-BTB—O1 | (4-3) | 6.8% |
| 4-BTB—O2 | (4-3) | 6.8% |
| 5-BTB—O1 | (4-3) | 6.8% |

NI = 92.7° C.;

Tc < −10° C.;

Δn = 0.249;

Δε = 16.3;

Vth = 1.57 V;

η = 63.4 mPa · s.

Example 10

| | | |
|---|---|---|
| 3-HB(F)TB-2 | (1-3) | 6% |
| 3-HB(F)TB-3 | (1-3) | 5% |
| 3-HB(F)TB-4 | (1-3) | 5% |
| 3-H2BTB-2 | (1-5) | 4% |
| 4-B(F)TB(F)B(F,F)XB(F,F) —CF3 | (2-1-6) | 5% |
| 5-B(F)TB(F)B(F,F)XB(F,F) —CF3 | (2-1-6) | 5% |
| 3-BB(F,F)XB(F,F) —F | (3-2) | 9% |
| 3-BB(F)B(F,F)XB(F) —F | (3-5) | 3% |
| 3-BB(F)B(F,F)XB(F,F) —F | (3-6) | 2% |
| 4-BB(F)B(F,F)XB(F,F) —F | (3-6) | 7% |
| 5-BB(F)B(F,F)XB(F,F) —F | (3-6) | 7% |
| 3-BB(F,F)XB(F)B(F,F) —F | (3-10) | 6% |
| 3-BB(F)B(F,F) —F | (3-14) | 3% |
| 2-BTB—O1 | (4-3) | 6.6% |
| 3-BTB—O1 | (4-3) | 6.6% |
| 4-BTB—O1 | (4-3) | 6.6% |
| 4-BTB—O2 | (4-3) | 6.6% |
| 5-BTB—O1 | (4-3) | 6.6% |

NI = 91.8° C.;

Tc < −10° C.;

Δn = 0.244;

Δε = 15.8;

Vth = 1.53 V;

η = 56.4 mPa · s.

Example 11

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 4% |
| 3-H2BTB-3 | (1-5) | 4% |
| 5-B(F)B(F,F)XB(F,F)TB(F,F)-F | (2-2-2) | 5% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7% |
| 3-BTB-O1 | (4-3) | 7% |
| 4-BTB-O1 | (4-3) | 7% |
| 4-BTB-O2 | (4-3) | 7% |
| 5-BTB-O1 | (4-3) | 7% |

NI = 91.1° C.; Tc < −10° C.; Δn = 0.244; Δε = 11.7; Vth = 1.69 V; η = 48.8 mPa · s.

Example 12

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 3-B(F)TB(F,F)XB(F)B(F,F)-F | (2-2-1) | 4% |
| 4-B(F)TB(F,F)XB(F)B(F,F)-F | (2-2-1) | 8% |
| 5-B(F)TB(F,F)XB(F)B(F,F)-F | (2-2-1) | 8% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 5% |
| 3-BTB-O1 | (4-3) | 5% |
| 4-BTB-O1 | (4-3) | 5% |
| 4-BTB-O2 | (4-3) | 5% |
| 5-BTB-O1 | (4-3) | 5% |

NI = 91.8° C.; Tc < −10° C.; Δn = 0.240; Δε = 21.0; Vth = 1.32 V; η = 62.4 mPa · s.

Example 13

| | | |
|---|---|---|
| 3-BB(F)TB-2 | (1-4) | 6% |
| 3-BB(F)TB-3 | (1-4) | 6% |
| 3-BB(F)TB-4 | (1-4) | 6% |
| 5-BTB(F)B(F,F)XB(F,F)-F | (2-1-1) | 7% |
| 5-BB(F)TB(F,F)XB(F,F)-F | (2-1-2) | 7% |
| 5-BB(F)TB(F,F)XB(F,F)-CF3 | (2-1-5) | 7% |
| 4-B(F)TB(F)B(F,F)XB(F,F)-CF3 | (2-1-6) | 5% |
| 5-B(F)TB(F)B(F,F)XB(F,F)-CF3 | (2-1-6) | 5% |
| 5-B(F)TB(F,F)XB(F)B(F,F)-F | (2-2-1) | 10% |
| 2-BTB-O1 | (4-3) | 8.2% |
| 3-BTB-O1 | (4-3) | 8.2% |
| 4-BTB-O1 | (4-3) | 8.2% |
| 4-BTB-O2 | (4-3) | 8.2% |
| 5-BTB-O1 | (4-3) | 8.2% |

NI = 99.9° C.; Tc < −10° C.; Δn = 0.296; Δε = 15.1; Vth = 1.66 V; η = 59.4 mPa · s.

Example 14

| | | |
|---|---|---|
| 3-BB(F)TB-2 | (1-4) | 8% |
| 3-BB(F)TB-3 | (1-4) | 8% |
| 3-BB(F)TB-4 | (1-4) | 7% |
| 5-BB(F)TB(F,F)XB(F,F)-F | (2-1-2) | 5% |
| 5-BB(F)TB(F,F)XB(F,F)-CF3 | (2-1-5) | 5% |
| 4-B(F)TB(F,F)XB(F)B(F,F)-F | (2-2-1) | 7% |
| 5-B(F)TB(F,F)XB(F)B(F,F)-F | (2-2-1) | 7% |
| 3-BB(F)B(F,F)XB(F,F)-F | (3-6) | 2% |
| 4-BB(F)B(F,F)XB(F,F)-F | (3-6) | 8% |
| 5-BB(F)B(F,F)XB(F,F)-F | (3-6) | 7% |
| 2-BTB-O1 | (4-3) | 7.2% |
| 3-BTB-O1 | (4-3) | 7.2% |
| 4-BTB-O1 | (4-3) | 7.2% |
| 4-BTB-O2 | (4-3) | 7.2% |
| 5-BTB-O1 | (4-3) | 7.2% |

NI = 105.2° C.; Tc < −10° C.; Δn = 0.295; Δε = 14.3; Vth = 1.74 V; η = 62.0 mPa · s.

Example 15

| | | |
|---|---|---|
| 3-BB(F)TB-2 | (1-4) | 5% |
| 3-BB(F)TB-3 | (1-4) | 5% |
| 3-BB(F)TB-4 | (1-4) | 5% |
| 3-BTB(F)TB-5 | (1-11) | 5% |
| 5-BB(F)TB(F,F)XB(F,F)-F | (2-1-2) | 5% |
| 5-BB(F)TB(F,F)XB(F,F)-CF3 | (2-1-5) | 5% |
| 4-B(F)TB(F,F)XB(F)B(F,F)-F | (2-2-1) | 5% |
| 5-B(F)TB(F,F)XB(F)B(F,F)-F | (2-2-1) | 5% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-GB(F)B(F,F)XB(F,F)-F | (3-9) | 3% |
| 4-GB(F)B(F,F)XB(F,F)-F | (3-9) | 3% |
| 5-GB(F)B(F,F)XB(F,F)-F | (3-9) | 2% |
| 2-BTB-O1 | (4-3) | 7.2% |
| 3-BTB-O1 | (4-3) | 7.2% |
| 4-BTB-O1 | (4-3) | 7.2% |
| 4-BTB-O2 | (4-3) | 7.2% |
| 5-BTB-O1 | (4-3) | 7.2% |

NI = 103.6° C.; Tc < −10° C.; Δn = 0.289; Δε = 17.8; Vth = 1.64 V; η = 73.8 mPa · s.

Example 16

| | | |
|---|---|---|
| 3-BB(F)TB-2 | (1-4) | 5% |
| 3-BB(F)TB-3 | (1-4) | 5% |
| 3-BB(F)TB-4 | (1-4) | 5% |
| 5-BB(F)TB(F,F)XB(F,F)-F | (2-1-2) | 5% |
| 5-BB(F)TB(F,F)XB(F,F)-CF3 | (2-1-5) | 5% |
| 4-B(F)TB(F,F)XB(F)B(F,F)-F | (2-2-1) | 5% |
| 5-B(F)TB(F,F)XB(F)B(F,F)-F | (2-2-1) | 5% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 2-BTB-O1 | (4-3) | 8.2% |
| 3-BTB-O1 | (4-3) | 8.2% |
| 4-BTB-O1 | (4-3) | 8.2% |
| 4-BTB-O2 | (4-3) | 8.2% |
| 5-BTB-O1 | (4-3) | 8.2% |
| 5-B(F)BB-2 | (4-7) | 5% |
| 5-HBB(F)B-2 | (4-13) | 3% |

NI = 102.8° C.; Tc < −10° C.; Δn = 0.283; Δε = 11.8; Vth = 1.85 V; η = 61.0 mPa · s.

Example 17

| | | |
|---|---|---|
| 3-HB(F)TB-2 | (1-3) | 4% |
| 3-BB(F)TB-2 | (1-4) | 7% |
| 3-BB(F)TB-3 | (1-4) | 7% |
| 3-BB(F)TB-4 | (1-4) | 7% |
| 3-BTB(F)TB-5 | (1-11) | 3% |
| 5-BTB(F)TB-2 | (1-11) | 3% |
| 4-BB(F)TB(F,F)XB(F,F)-F | (2-1-2) | 5% |
| 5-BB(F)TB(F,F)XB(F,F)-F | (2-1-2) | 5% |
| 4-B(F)TB(F,F)XB(F)B(F,F)-F | (2-2-1) | 5% |
| 5-B(F)TB(F,F)XB(F)B(F,F)-F | (2-2-1) | 5% |
| 3-GB(F,F)XB(F,F)-F | (3-4) | 2% |
| 3-BB(F)B(F,F)XB(F,F)-F | (3-6) | 2% |
| 4-BB(F)B(F,F)XB(F,F)-F | (3-6) | 8% |
| 5-BB(F)B(F,F)XB(F,F)-F | (3-6) | 7% |
| 3-GB(F)B(F,F)XB(F,F)-F | (3-9) | 2% |
| 3-HB-O2 | (4-1) | 5% |
| 1-BB-3 | (4-2) | 10% |
| 1-BB-5 | (4-2) | 8% |
| 1-BB(F)B-2V | (4-8) | 5% |

NI = 106.0° C.; Tc < −10° C.; Δn = 0.265; Δε = 15.3; Vth = 1.86 V; η = 57.0 mPa · s.

Example 18

| | | |
|---|---|---|
| 3-HB(F)TB-2 | (1-3) | 5% |
| 3-H2BTB-3 | (1-5) | 3% |
| 3-B2BTB-2 | (1-6) | 5% |
| 5-BTB(F)B(F,F)XB(F,F)-F | (2-1-1) | 10% |
| 5-B(F)TB(F,F)XB(F)B(F,F)-F | (2-2-1) | 5% |
| 5-B(F)B(F,F)XB(F,F)TB(F,F)-F | (2-2-2) | 5% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 1-BB-5 | (4-2) | 3% |
| 2-BTB-O1 | (4-3) | 7.2% |
| 3-BTB-O1 | (4-3) | 7.2% |
| 4-BTB-O1 | (4-3) | 7.2% |
| 4-BTB-O2 | (4-3) | 7.2% |
| 5-BTB-O1 | (4-3) | 7.2% |
| 3-HBB-2 | (4-5) | 3% |
| 1-BB(F)B-2V | (4-8) | 3% |
| 2-BB(2F,5F)B-2 | (4-9) | 3% |
| 5-HBB(F)B-2 | (4-13) | 3% |

NI = 95.5° C.; Tc < −10° C.; Δn = 0.258; Δε = 10.5; Vth = 1.90 V; η = 51.7 mPa · s.

Example 19

| | | |
|---|---|---|
| 3-HB(F)TB-2 | (1-3) | 6% |
| 3-HB(F)TB-3 | (1-3) | 6% |
| 3-HB(F)TB-4 | (1-3) | 5% |
| 3-H2BTB-2 | (1-5) | 3% |
| 3-H2BTB-3 | (1-5) | 3% |
| 3-H2BTB-4 | (1-5) | 3% |
| 5-BTB(F,F)XB(F,F)-F | (2-1-8) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 5.4% |
| 3-BTB-O1 | (4-3) | 5.4% |
| 4-BTB-O1 | (4-3) | 5.4% |
| 4-BTB-O2 | (4-3) | 5.4% |
| 5-BTB-O1 | (4-3) | 5.4% |

NI = 90.4° C.; Tc < −10° C.; Δn = 0.237; Δε = 13.5; Vth = 1.62 V; η = 52.1 mPa · s.

Example 20

| | | |
|---|---|---|
| 3-HB(F)TB-2 | (1-3) | 6% |
| 3-HB(F)TB-3 | (1-3) | 6% |
| 3-HB(F)TB-4 | (1-3) | 6% |
| 3-H2BTB-2 | (1-5) | 3% |
| 3-H2BTB-3 | (1-5) | 3% |
| 3-H2BTB-4 | (1-5) | 3% |
| 5-B(F)TB(F,F)XB(F,F)-F | (2-1-9) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 5.2% |
| 3-BTB-O1 | (4-3) | 5.2% |
| 4-BTB-O1 | (4-3) | 5.2% |
| 4-BTB-O2 | (4-3) | 5.2% |
| 5-BTB-O1 | (4-3) | 5.2% |

NI = 90.7° C.; Tc < −10° C.; Δn = 0.237; Δ∈ = 14.1; Vth = 1.58 V; η = 51.0 mPa · s.

Example 21

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 2% |
| 5-B(F)TB(F)TB(F,F)XB(F,F)-F | (2-1-7) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7.2% |
| 3-BTB-O1 | (4-3) | 7.2% |
| 4-BTB-O1 | (4-3) | 7.2% |
| 4-BTB-O2 | (4-3) | 7.2% |
| 5-BTB-O1 | (4-3) | 7.2% |

NI = 89.8° C.; Tc < −10° C.; Δn = 0.254; Δ∈ = 14.5; Vth = 1.56 V; η = 48.8 mPa · s.

Example 22

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 3-H2BTB-3 | (1-5) | 3% |
| 5-BB(F,F)TB(F,F)XB(F,F)-CF3 | (2-1-10) | 5% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7.4% |
| 3-BTB-O1 | (4-3) | 7.4% |
| 4-BTB-O1 | (4-3) | 7.4% |
| 4-BTB-O2 | (4-3) | 7.4% |
| 5-BTB-O1 | (4-3) | 7.4% |

NI = 89.5° C.; Tc < −10° C.; Δn = 0.246; Δ∈ = 12.4; Vth = 1.67 V.

Example 23

| | | |
|---|---|---|
| 3-BB(F)TB-2 | (1-4) | 8% |
| 3-BB(F)TB-3 | (1-4) | 8% |
| 3-BB(F)TB-4 | (1-4) | 8% |
| 5-BTB(F)B(F,F)XB(F,F)-F | (2-1-1) | 14% |
| 5-B(F)TB(F,F)XB(F,F)-F | (2-1-9) | 3% |
| 4-BB(F)B(F,F)XB(F,F)-F | (3-6) | 8% |
| 5-BB(F)B(F,F)XB(F,F)-F | (3-6) | 8% |
| 3-BB(F)XB(F)B(F,F)-F | (3-10) | 6% |
| 2-BTB-O1 | (4-3) | 7.4% |
| 3-BTB-O1 | (4-3) | 7.4% |
| 4-BTB-O1 | (4-3) | 7.4% |
| 4-BTB-O2 | (4-3) | 7.4% |
| 5-BTB-O1 | (4-3) | 7.4% |

NI = 103.8° C.; Tc < −10° C.; Δn = 0.292; Δ∈ = 12.0; Vth = 1.95 V.

Example 24

| | | |
|---|---|---|
| 3-HB(F)TB-2 | (1-3) | 5% |
| 3-HB(F)TB-3 | (1-3) | 5% |
| 3-HB(F)TB-4 | (1-3) | 3% |
| 3-H2BTB-2 | (1-5) | 3% |
| 4O-BB(F)TB(F,F)XB(F,F)-F | (2-1-2) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7.4% |
| 3-BTB-O1 | (4-3) | 7.4% |
| 4-BTB-O1 | (4-3) | 7.4% |
| 4-BTB-O2 | (4-3) | 7.4% |
| 5-BTB-O1 | (4-3) | 7.4% |

NI = 92.0° C.; Tc < −10° C.; Δn = 0.254; Δ∈ = 14.6; Vth = 1.64 V.

Example 25

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 3-H2BTB-3 | (1-5) | 3% |
| 4O-BB(F)TB(F,F)XB(F,F)-F | (2-1-5) | 5% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7.4% |
| 3-BTB-O1 | (4-3) | 7.4% |
| 4-BTB-O1 | (4-3) | 7.4% |
| 4-BTB-O2 | (4-3) | 7.4% |
| 5-BTB-O1 | (4-3) | 7.4% |

NI = 92.1° C.; Tc < −10° C.; Δn = 0.250; Δ∈ = 12.4; Vth = 1.67 V.

Example 26

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |

-continued

| | | |
|---|---|---|
| 3-H2BTB-2 | (1-5) | 4% |
| 4O-B(F)TB(F)B(F,F)XB(F,F)-F | (2-1-11) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 6.8% |
| 3-BTB-O1 | (4-3) | 6.8% |
| 4-BTB-O1 | (4-3) | 6.8% |
| 4-BTB-O2 | (4-3) | 6.8% |
| 5-BTB-O1 | (4-3) | 6.8% |

NI = 93.4° C.; Tc < −10° C.; Δn = 0.250; Δ∈ = 14.7; Vth = 1.56 V.

Example 27

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 4% |
| 5-BTB(F)B(F,F)XB(F,F)-CF3 | (2-1-12) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 6.8% |
| 3-BTB-O1 | (4-3) | 6.8% |
| 4-BTB-O1 | (4-3) | 6.8% |
| 4-BTB-O2 | (4-3) | 6.8% |
| 5-BTB-O1 | (4-3) | 6.8% |

NI = 91.6° C.; Tc < −10° C.; Δn = 0.248; Δ∈ = 15.8; Vth = 1.57 V.

Example 28

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 4% |
| 4-BTB(F)B(F,F)XB(F,F)-F | (2-1-1) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 6.8% |
| 3-BTB-O1 | (4-3) | 6.8% |
| 4-BTB-O1 | (4-3) | 6.8% |
| 4-BTB-O2 | (4-3) | 6.8% |
| 5-BTB-O1 | (4-3) | 6.8% |

NI = 92.1° C.; Tc < −10° C.; Δn = 0.247; Δ∈ = 14.8; Vth = 1.54 V.

Example 29

| | | |
|---|---|---|
| 3-BB(F)TB-2 | (1-4) | 8% |
| 3-BB(F)TB-3 | (1-4) | 7% |
| 3-BB(F)TB-4 | (1-4) | 7% |
| 4-BTB(F)B(F,F)XB(F,F)-F | (2-1-1) | 8% |
| 5-BTB(F)B(F,F)XB(F,F)-F | (2-1-1) | 8% |

-continued

| | | |
|---|---|---|
| 3-BB(F)B(F,F)XB(F,F)-F | (3-6) | 2% |
| 4-BB(F)B(F,F)XB(F,F)-F | (3-6) | 8% |
| 5-BB(F)B(F,F)XB(F,F)-F | (3-6) | 8% |
| 3-BB(F,F)XB(F)B(F,F)-F | (3-10) | 5% |
| 2-BTB-O1 | (4-3) | 7.8% |
| 3-BTB-O1 | (4-3) | 7.8% |
| 4-BTB-O1 | (4-3) | 7.8% |
| 4-BTB-O2 | (4-3) | 7.8% |
| 5-BTB-O1 | (4-3) | 7.8% |

NI = 104.8° C.; Tc < −10° C.; Δn = 0.294; Δ∈ = 13.0; Vth = 1.94 V; γ1 = 473 mPa · s; VHR-1 = 98.01%; VHR-3 = 95.50%.

Example 30

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 5-B(F)BTB(F,F)XB(F,F)-F | (2-1-13) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7% |
| 3-BTB-O1 | (4-3) | 7% |
| 4-BTB-O1 | (4-3) | 7% |
| 4-BTB-O2 | (4-3) | 7% |
| 5-BTB-O1 | (4-3) | 7% |

NI = 90.9° C.; Tc < −10° C.; Δn = 0.248; Δ∈ = 14.3; Vth = 1.60 V.

Example 31

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 3-H2BTB-3 | (1-5) | 3% |
| 3-B(F)TB(F,F)XB(F)B(F,F)-F | (2-2-1) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 6.4% |
| 3-BTB-O1 | (4-3) | 6.4% |
| 4-BTB-O1 | (4-3) | 6.4% |
| 4-BTB-O2 | (4-3) | 6.4% |
| 5-BTB-O1 | (4-3) | 6.4% |

NI = 91.5° C.; Tc < −10° C.; Δn = 0.244; Δ∈ = 14.8; Vth = 1.53 V.

Example 32

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 2% |
| 4O-BTB(F)B(F,F)XB(F,F)-F | (2-1-1) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |

-continued

| | | |
|---|---|---|
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7.2% |
| 3-BTB-O1 | (4-3) | 7.2% |
| 4-BTB-O1 | (4-3) | 7.2% |
| 4-BTB-O2 | (4-3) | 7.2% |
| 5-BTB-O1 | (4-3) | 7.2% |

NI = 91.5° C.; Tc < −10° C.; Δn = 0.252; Δ∈ = 14.8; Vth = 1.53 V.

Example 33

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 4% |
| 4O-B(F)TB(F)B(F,F)XB(F,F)-CF3 | (2-1-6) | 10% |
| 3-BB(F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 6.8% |
| 3-BTB-O1 | (4-3) | 6.8% |
| 4-BTB-O1 | (4-3) | 6.8% |
| 4-BTB-O2 | (4-3) | 6.8% |
| 5-BTB-O1 | (4-3) | 6.8% |

NI = 92.4° C.; Tc < −10° C.; Δn = 0.249; Δ∈ = 15.6; Vth = 1.54 V.

Example 34

| | | |
|---|---|---|
| 3-HB(F)TB-2 | (1-3) | 4% |
| 3-HB(F)TB-3 | (1-3) | 4% |
| 3-BB(F)TB-2 | (1-4) | 7% |
| 3-BB(F)TB-3 | (1-4) | 7% |
| 3-BB(F)TB-4 | (1-4) | 7% |
| 4-BTB(F)B(F,F)XB(F,F)-F | (2-1-1) | 7% |
| 5-BTB(F)B(F,F)XB(F,F)-F | (2-1-1) | 7% |
| 3-BB(F)B(F,F)XB(F,F)-F | (3-6) | 2% |
| 4-BB(F)B(F,F)XB(F,F)-F | (3-6) | 10% |
| 5-BB(F)B(F,F)XB(F,F)-F | (3-6) | 6% |
| 3-BB(F,F)XB(F)B(F,F)-F | (3-10) | 6% |
| 2-BTB-O1 | (4-3) | 6.6% |
| 3-BTB-O1 | (4-3) | 6.6% |
| 4-BTB-O1 | (4-3) | 6.6% |
| 4-BTB-O2 | (4-3) | 6.6% |
| 5-BTB-O1 | (4-3) | 6.6% |

NI = 113.9° C.; Tc < −10° C.; Δn = 0.291; Δ∈ = 12.5; Vth = 2.03 V; γ1 = 438 mPa · s.

Example 35

| | | |
|---|---|---|
| 3-HB(F)TB-2 | (1-3) | 5% |
| 3-HB(F)TB-3 | (1-3) | 5% |
| 3-HB(F)TB-4 | (1-3) | 4% |
| 3-H2BTB-2 | (1-5) | 3% |
| 5-PyB(F)TB(F,F)XB(F,F)-F | (2-1-14) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |

-continued

| | | |
|---|---|---|
| 2-BTB-O1 | (4-3) | 7.2% |
| 3-BTB-O1 | (4-3) | 7.2% |
| 4-BTB-O1 | (4-3) | 7.2% |
| 4-BTB-O2 | (4-3) | 7.2% |
| 5-BTB-O1 | (4-3) | 7.2% |

NI = 88.8° C.; Tc < −10° C.; Δn = 0.249; Δ∈ = 15.5; Vth = 1.54 V.

Example 36

| | | |
|---|---|---|
| 3-HB(F)TB-2 | (1-3) | 5% |
| 3-HB(F)TB-3 | (1-3) | 5% |
| 3-HB(F)TB-4 | (1-3) | 5% |
| 3-H2BTB-2 | (1-5) | 3% |
| 4O-BTB(F)B(F,F)XB(F,F)-CF3 | (2-1-12) | 10% |
| 3-BB(F,F)XB(F,F)-F | (3-2) | 9% |
| 3-BB(F)B(F,F)XB(F)-F | (3-5) | 3% |
| 3-BB(F)B(F,F)XB(F,F)-F | (3-6) | 2% |
| 4-BB(F)B(F,F)XB(F,F)-F | (3-6) | 7% |
| 5-BB(F)B(F,F)XB(F,F)-F | (3-6) | 7% |
| 3-BB(F,F)XB(F)B(F,F)-F | (3-10) | 6% |
| 3-BB(F)B(F,F)-F | (3-14) | 3% |
| 2-BTB-O1 | (4-3) | 7% |
| 3-BTB-O1 | (4-3) | 7% |
| 4-BTB-O1 | (4-3) | 7% |
| 4-BTB-O2 | (4-3) | 7% |
| 5-BTB-O1 | (4-3) | 7% |

NI = 92.6° C.; Tc < −10° C.; Δn = 0.250; Δ∈ = 15.2; Vth = 1.62 V.

Example 37

| | | |
|---|---|---|
| 3-HB(F)TB-2 | (1-3) | 5% |
| 3-HB(F)TB-3 | (1-3) | 4% |
| 3-BB(F)TB-2 | (1-4) | 7% |
| 3-BB(F)TB-3 | (1-4) | 7% |
| 3-BB(F)TB-4 | (1-4) | 7% |
| 4-BTB(F)B(F,F)XB(F,F)-F | (2-1-1) | 6% |
| 5-BTB(F)B(F,F)XB(F,F)-F | (2-1-1) | 6% |
| 3-BB(F)B(F,F)XB(F,F)-F | (3-6) | 2% |
| 4-BB(F)B(F,F)XB(F,F)-F | (3-6) | 10% |
| 5-BB(F)B(F,F)XB(F,F)-F | (3-6) | 6% |
| 3-BB(F,F)XB(F)B(F,F)-F | (3-10) | 6% |
| 2-BTB-O1 | (4-3) | 6.8% |
| 3-BTB-O1 | (4-3) | 6.8% |
| 4-BTB-O1 | (4-3) | 6.8% |
| 4-BTB-O2 | (4-3) | 6.8% |
| 5-BTB-O1 | (4-3) | 6.8% |

NI = 113.4° C.; Tc < −10° C.; Δn = 0.292; Δ∈ = 11.1; Vth = 2.01 V.

Example 38

| | | |
|---|---|---|
| 3-HB(F)TB-2 | (1-3) | 4% |
| 3-HB(F)TB-3 | (1-3) | 4% |
| 3O-BB(F)TB-2 | (1-4) | 6% |
| 3O-BB(F)TB-3 | (1-4) | 5% |
| 3O-BB(F)TB-4 | (1-4) | 5% |
| 4-BTB(F)B(F,F)XB(F,F)-F | (2-1-1) | 7% |
| 5-BTB(F)B(F,F)XB(F,F)-F | (2-1-1) | 7% |
| 5-B(F)TB(F,F)XB(F,F)-F | (2-1-9) | 3% |
| 4-BB(F)B(F,F)XB(F,F)-F | (3-6) | 8% |
| 5-BB(F)B(F,F)XB(F,F)-F | (3-6) | 8% |
| 3-BB(F,F)XB(F)B(F,F)-F | (3-10) | 6% |
| 2-BTB-O1 | (4-3) | 7.4% |
| 3-BTB-O1 | (4-3) | 7.4% |

-continued

| | | |
|---|---|---|
| 4-BTB-O1 | (4-3) | 7.4% |
| 4-BTB-O2 | (4-3) | 7.4% |
| 5-BTB-O1 | (4-3) | 7.4% |

NI = 106.2° C.; Tc < −10° C.; Δn = 0.292; Δ∈ = 12.2; Vth = 1.90 V.

Example 39

| | | |
|---|---|---|
| 3-HB(F)TB-2 | (1-3) | 4% |
| 3-HB(F)TB-3 | (1-3) | 4% |
| 3-BB(F)TB-O2 | (1-4) | 7% |
| 3-BB(F)TB-O3 | (1-4) | 7% |
| 3-BB(F)TB-O4 | (1-4) | 7% |
| 3O-BTB(F)B(F,F)XB(F,F)-F | (2-1-1) | 6% |
| 4O-BTB(F)B(F,F)XB(F,F)-F | (2-1-1) | 6% |
| 3-BB(F)B(F,F)XB(F,F)-F | (3-6) | 2% |
| 4-BB(F)B(F,F)XB(F,F)-F | (3-6) | 10% |
| 5-BB(F)B(F,F)XB(F,F)-F | (3-6) | 6% |
| 3-BB(F,F)XB(F)B(F,F)-F | (3-10) | 6% |
| 2-BTB-O1 | (4-3) | 7% |
| 3-BTB-O1 | (4-3) | 7% |
| 4-BTB-O1 | (4-3) | 7% |
| 4-BTB-O2 | (4-3) | 7% |
| 5-BTB-O1 | (4-3) | 7% |

NI = 114.5° C.; Tc < −10° C.; Δn = 0.296; Δ∈ = 11.8; Vth = 1.95 V.

Comparative Example 2

For comparison, Comparative Example 2 was applied in which a composition prepared by using a compound having positive dielectric anisotropy and having a cyano group in place of part of compound (2-1-1) in Example 29 was used.

| | | |
|---|---|---|
| 3-BB(F)TB-2 | (1-4) | 8% |
| 3-BB(F)TB-3 | (1-4) | 7% |
| 3-BB(F)TB-4 | (1-4) | 7% |
| 4-BTB(F)B(F,F)XB(F,F)-F | (2-1-1) | 7% |
| 5-BTB(F)B(F,F)XB(F,F)-F | (2-1-1) | 6% |
| 3-BB(F)B(F,F)XB(F,F)-F | (3-6) | 2% |
| 4-BB(F)B(F,F)XB(F,F)-F | (3-6) | 8% |
| 5-BB(F)B(F,F)XB(F,F)-F | (3-6) | 8% |
| 3-BB(F,F)XB(F)B(F,F)-F | (3-10) | 5% |
| 2-BTB-O1 | (4-3) | 7.8% |
| 3-BTB-O1 | (4-3) | 7.8% |
| 4-BTB-O1 | (4-3) | 7.8% |
| 4-BTB-O2 | (4-3) | 7.8% |
| 5-BTB-O1 | (4-3) | 7.8% |
| 1V2-BEB(F,F)-C | (—) | 3% |

NI = 99.0° C.; Tc < −10° C.; Δn = 0.289; Δ∈ = 15.0; Vth = 1.70 V; VHR-1 = 96.7%; VHR-3 = 78.3%.

VHR of the compound having the cyano group is decreased after irradiated with ultraviolet light, and therefore the compound is found to be unsuitable as a liquid crystal composition of the invention.

INDUSTRIAL APPLICABILITY

A liquid crystal composition of the invention satisfies at least one of characteristics such as high maximum temperature, low minimum temperature, large optical anisotropy, large positive dielectric anisotropy and high stability to ultraviolet light, or has a suitable balance regarding at least two of the characteristics. A liquid crystal display device including the composition can be used in an active matrix (AM) device having a TN mode, an OCB mode, an IPS mode, an FFS mode or an FPA mode, and particularly, a production cost can be decreased by encapsulating the composition, or the resulting product can also be used in a flexible display. Moreover, a device including the composition can be used as a switching device between 2D and 3D.

What is claimed is:

1. A liquid crystal composition having positive dielectric anisotropy, containing at least one compound selected from the group of compounds represented by formula (1) as a first component, and at least one compound selected from the group of compounds represented by formula (2-1) or formula (2-2) as a second component, and a compound having cyano, and dielectric anisotropy as an optional component, wherein the compound having cyano is a compound other than the compounds of the first component and the second component, and when the compound having cyano is included in the liquid crystal composition, a proportion of the compound having cyano is less than 3% by weight based on a total of the liquid crystal composition:

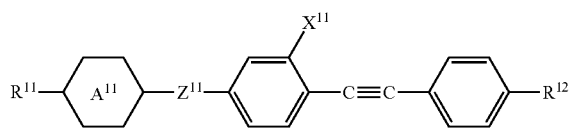

(1)

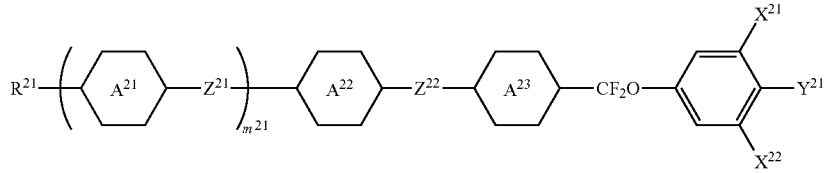

(2-1)

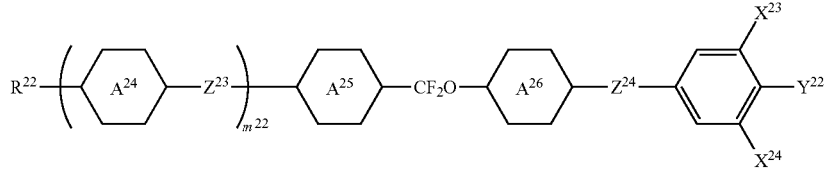

(2-2)

wherein, in formula (1), formula (2-1) and formula (2-2), $R^{11}$, $R^{12}$, $R^{21}$ and $R^{22}$ are independently alkyl having 1 to 12 carbons, alkoxy having 1 to 12 carbons or alkenyl having 2 to 12 carbons; ring $A^{11}$ is 1,4-cyclohexylene, 1,4-phenylene, 2-fluoro-1,4-phenylene, 2,5-difluoro-1,4-phenylene or 2,6-difluoro-1,4-phenylene; ring $A^{21}$ and ring $A^{24}$ are independently 1,4-cyclohexylene, 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; ring $A^{22}$, ring $A^{23}$, ring $A^{25}$ and ring $A^{26}$ are independently 1,4-phenylene, 2-fluoro-1,4-phenylene or 2,6-difluoro-1,4-phenylene; $Z^{11}$, $Z^{21}$, $Z^{22}$, $Z^{23}$ and $Z^{24}$ are independently a single bond, ethylene, vinylene, methyleneoxy, carbonyloxy, difluoromethyleneoxy, ethynylene or tetrafluoroethylene, in which at least one of $Z^{21}$ and $Z^{22}$ is ethynylene, and at least one of $Z^{23}$ and $Z^{24}$ is ethynylene; $X^{11}$, $X^{21}$, $X^{22}$, $X^{23}$ and $X^{24}$ are independently hydrogen or fluorine; $Y^{21}$ and $Y^{22}$ are independently fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and $m^{21}$ and $m^{22}$ are independently 0, 1 or 2, and when $m^{21}$ or $m^{22}$ represents 2, a plurality of ring $A^{21}$, $Z^{21}$, ring $A^{24}$ and $Z^{23}$ may be identical or different, respectively.

2. The liquid crystal composition according to claim 1, containing at least one compound selected from the group of compounds represented by formula (1-1) to formula (1-13) as the first component:

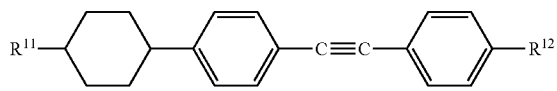
(1-1)

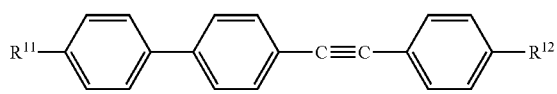
(1-2)

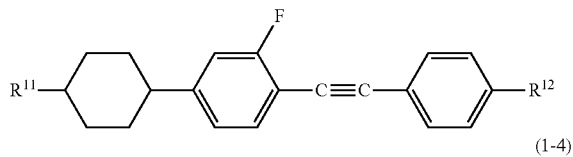
(1-3)

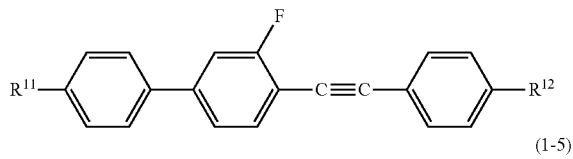
(1-4)

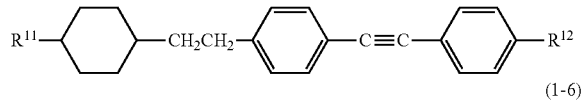
(1-5)

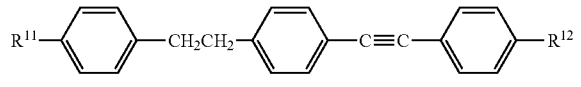
(1-6)

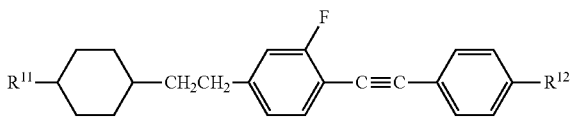
(1-7)

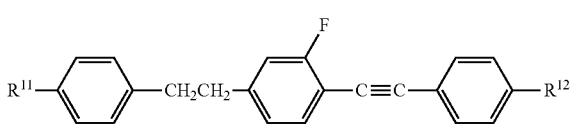
(1-8)

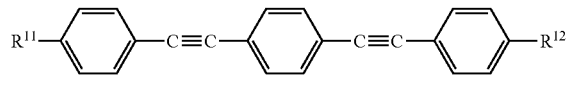
(1-9)

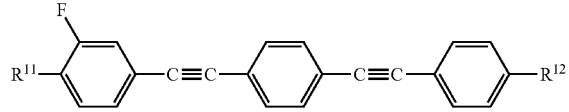
(1-10)

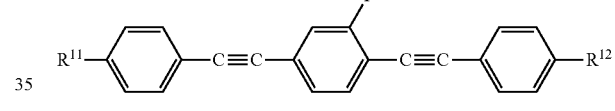
(1-11)

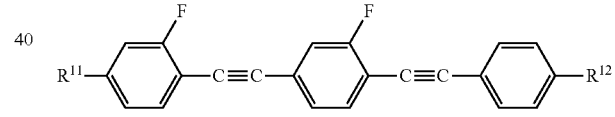
(1-12)

(1-13)

wherein, in the formulas, $R^{11}$ and $R^{12}$ are independently alkyl having 1 to 12 carbons, alkoxy having 1 to 12 carbons or alkenyl having 2 to 12 carbons.

3. The liquid crystal composition according to claim 1, wherein a proportion of a compound represented by formula (1) described in claim 1 is in the range of 10% by weight to 50% by weight based on the weight of the liquid crystal composition.

4. The liquid crystal composition according to claim 1, containing at least one compound selected from the group of compounds represented by formula (2-1-1) to formula (2-1-14) and formula (2-2-1) to formula (2-2-2) as the second component:

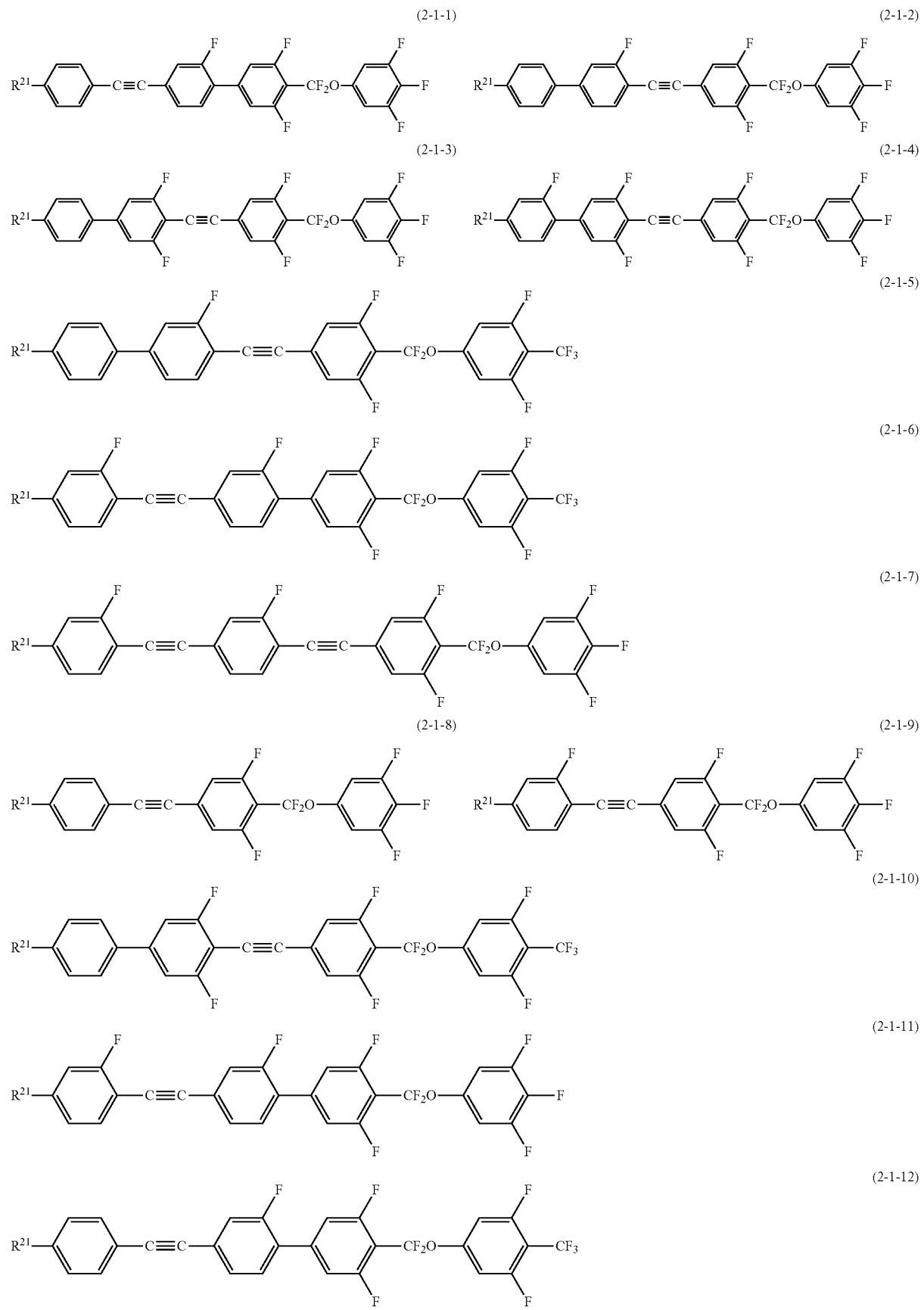

-continued (2-1-13)
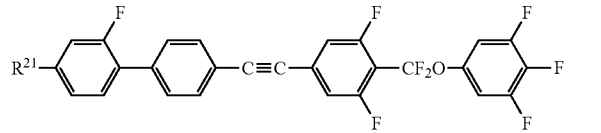

(2-1-14)
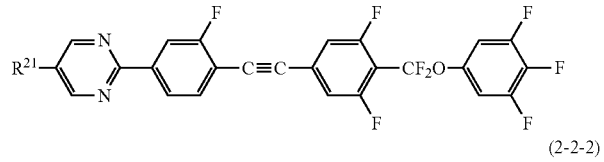

(2-2-1)

(2-2-2)
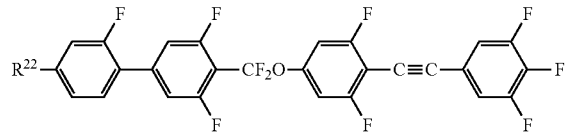

wherein, in the formulas, $R^{21}$ and $R^{22}$ are independently alkyl having 1 to 12 carbons, alkoxy having 1 to 12 carbons or alkenyl having 2 to 12 carbons.

5. The liquid crystal composition according to claim 1, wherein a proportion of a compound represented by formula (2-1) and formula (2-2) described in claim 1 is in the range of 5% by weight to 60% by weight based on the weight of the liquid crystal composition.

6. The liquid crystal composition according to claim 1, further containing at least one compound selected from the group of compounds represented by formula (3) as a third component:

(3)
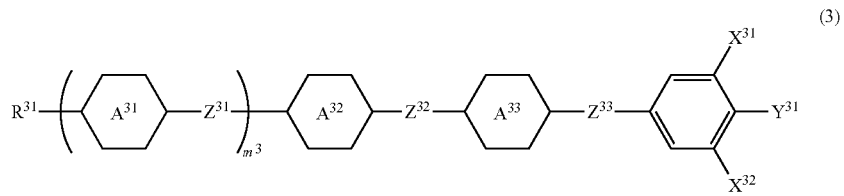

wherein, in formula (3), $R^{31}$ is alkyl having 1 to 12 carbons, alkoxy having 1 to 12 carbons or alkenyl having 2 to 12 carbons; ring $A^{31}$ is 1,4-cyclohexylene, 1,4-phenylene, 2-fluoro-1,4-phenylene, 2,6-difluoro-1,4-phenylene, pyridine-2,5-diyl, pyrimidine-2,5-diyl, 1,3-dioxane-2,5-diyl or tetrahydropyran-2,5-diyl; ring $A^{32}$ and ring $A^{33}$ are independently 1,4-phenylene, 2-fluoro-1,4-phenylene, 1,3-dioxane-2,5-diyl or 2,6-difluoro-1,4-phenylene; $Z^{31}$, $Z^{32}$ and $Z^{33}$ are independently a single bond, ethylene, vinylene, methyleneoxy, carbonyloxy, difluoromethyleneoxy or tetrafluoroethylene; $X^{31}$ and $X^{32}$ are independently hydrogen or fluorine; $Y^{31}$ is fluorine, chlorine, alkyl having 1 to 12 carbons in which at least one piece of hydrogen may be replaced by halogen, alkoxy having 1 to 12 carbons in which at least one piece of hydrogen may be replaced by halogen, or alkenyl having 2 to 12 carbons in which at least one piece of hydrogen may be replaced by halogen; and $m^3$ is 0, 1 or 2, and when $m^3$ represents 2, a plurality of ring $A^{31}$ and $Z^{31}$ may be identical or different, respectively.

7. The liquid crystal composition according to claim 1, containing at least one compound selected from the group of compounds represented by formula (3-1) to formula (3-15) as the third component:

(3-1)
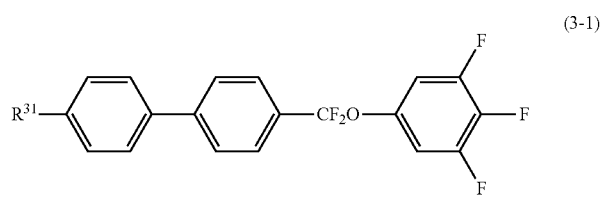

(3-2)
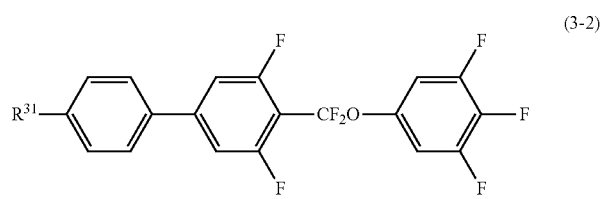

(3-3)
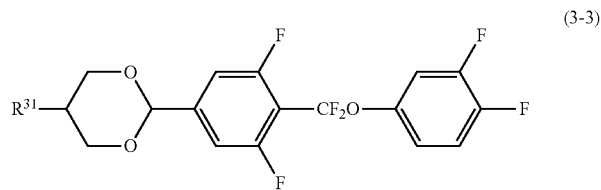

(3-4)
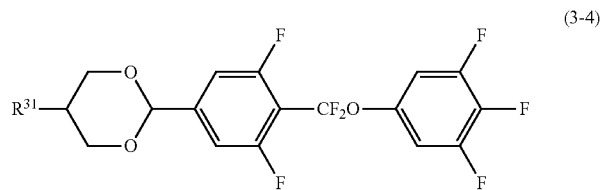

-continued
(3-5)
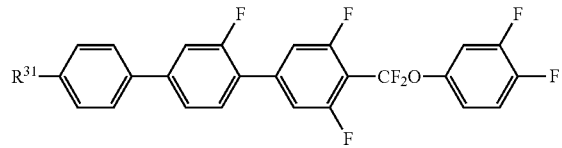
(3-6)
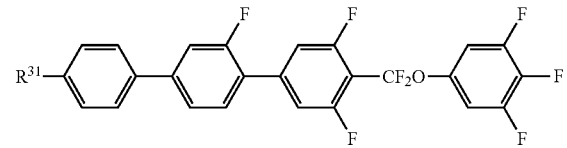
(3-7)
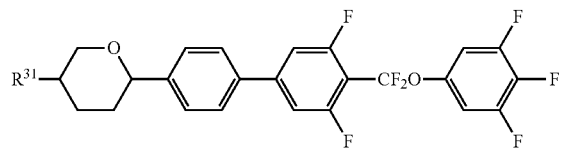
(3-8)
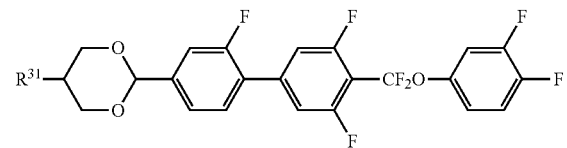
(3-9)
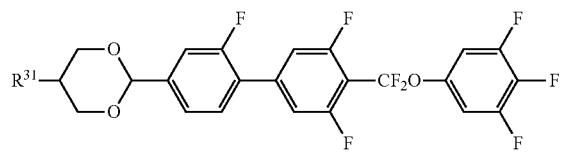
(3-10)
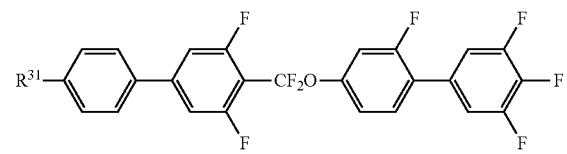
(3-11)
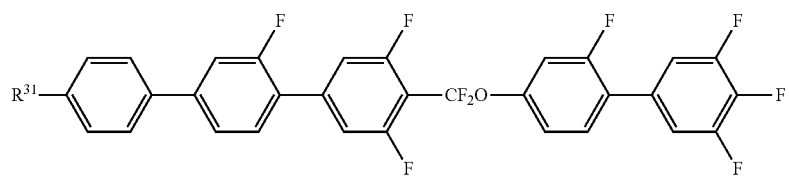
(3-12)
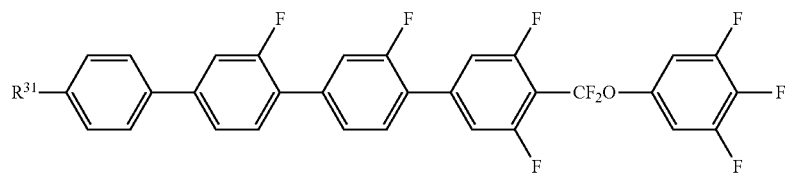
(3-13)
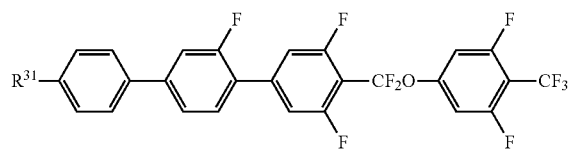
(3-14)
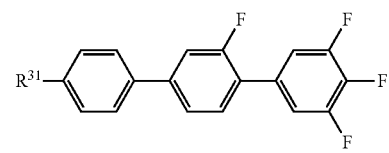
(3-15)
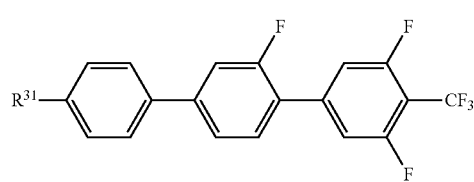

wherein, in the formulas, $R^{31}$ is alkyl having 1 to 12 carbons, alkoxy having 1 to 12 carbons or alkenyl having 2 to 12 carbons.

8. The liquid crystal composition according to claim 6, wherein a proportion of the third component is in the range of 1% by weight to 50% by weight based on the weight of the liquid crystal composition.

9. The liquid crystal composition according to claim 1, further containing at least one compound selected from the group of compounds represented by formula (4):

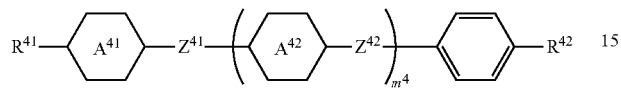

(4)

wherein, in formula (4), $R^{41}$ and $R^{42}$ are independently alkyl having 1 to 12 carbons, alkoxy having 1 to 12 carbons or alkenyl having 2 to 12 carbons; ring $A^{41}$ and ring $A^{42}$ are independently 1,4-cyclohexylene, 1,4-phenylene, 2-fluoro-1,4-phenylene, 2,5-difluoro-1,4-phenylene or 2,6-difluoro-1,4-phenylene; $Z^{41}$ is a single bond, ethylene, vinylene, methyleneoxy, carbonyloxy, difluoromethyleneoxy, ethynylene or tetrafluoroethylene; $Z^{42}$ is a single bond, ethylene, vinylene, methyleneoxy, carbonyloxy, difluoromethyleneoxy or tetrafluoroethylene; and $m^4$ is 0, 1 or 2, and when $m^4$ represents 2, a plurality of ring $A^{42}$ and $Z^{42}$ may be identical or different, respectively.

10. The liquid crystal composition according to claim 1, containing at least one compound selected from the group of compounds represented by formula (4-1) to formula (4-13):

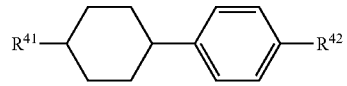

(4-1)

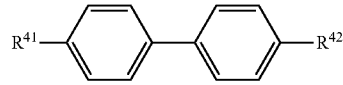

(4-2)

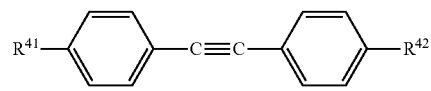

(4-3)

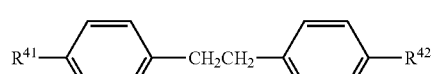

(4-4)

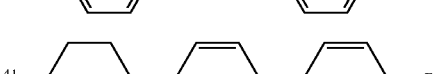

(4-5)

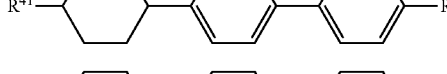

(4-6)

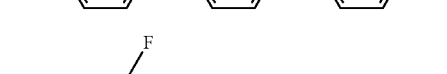

(4-7)

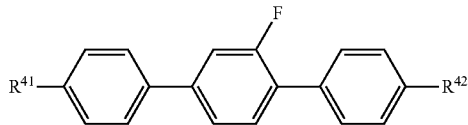

(4-8)

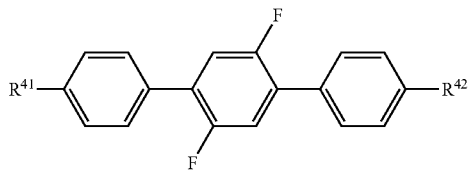

(4-9)

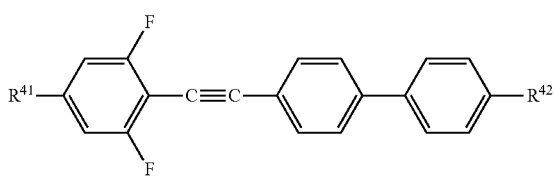

(4-10)

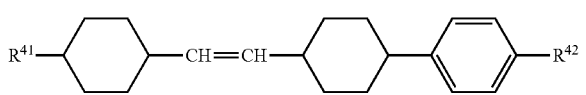

(4-11)

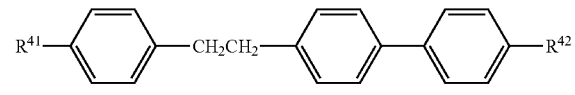

(4-12)

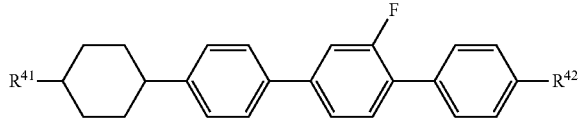

(4-13)

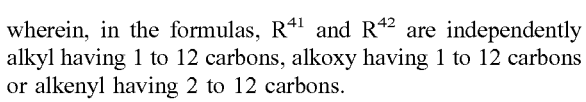

wherein, in the formulas, $R^{41}$ and $R^{42}$ are independently alkyl having 1 to 12 carbons, alkoxy having 1 to 12 carbons or alkenyl having 2 to 12 carbons.

11. The liquid crystal composition according to claim 9, wherein a proportion of the compounds represented by formula (4) is in the range of 5% by weight to 55% by weight based on the weight of the liquid crystal composition.

12. The liquid crystal composition according to claim 1, wherein an optical anisotropy (measured at 25° C.) at a wavelength of 589 nanometers is in the range of 0.20 to 0.35, and a dielectric anisotropy (measured at 25° C.) at a frequency of 1 kHz is in the range of 8 to 40.

13. A liquid crystal display device, including the liquid crystal composition according to claim 1.

14. A liquid crystal display device, including the liquid crystal composition according to claim 1, wherein the liquid crystal composition is encapsulated.

15. A liquid crystal display device, including the liquid crystal composition according to claim 1, wherein the liquid crystal composition is used in a lens that utilizes for switching between 2D and 3D.

\* \* \* \* \*